US011548800B2

(12) United States Patent
Franceschi-Hofmann et al.

(10) Patent No.: US 11,548,800 B2
(45) Date of Patent: Jan. 10, 2023

(54) WATER PURIFICATION APPARATUS AND METHOD

(71) Applicant: Geyser Remediation LLC, Killingworth, CT (US)

(72) Inventors: Nikolas C. -J. Franceschi-Hofmann, Killingworth, CT (US); Brendan MacIntyre, Bethel, CT (US); Nora Chov, Lansdale, PA (US)

( * ) Notice: Subject to any disclaimer, the term of this patent is extended or adjusted under 35 U.S.C. 154(b) by 0 days.

(21) Appl. No.: 16/855,987

(22) Filed: Apr. 22, 2020

(65) Prior Publication Data

US 2020/0339450 A1     Oct. 29, 2020

Related U.S. Application Data

(60) Provisional application No. 62/839,098, filed on Apr. 26, 2019.

(51) Int. Cl.
  *C02F 1/72* (2006.01)
  *C02F 1/32* (2006.01)
  (Continued)

(52) U.S. Cl.
  CPC .......... *C02F 1/725* (2013.01); *B01J 27/1815* (2013.01); *B01J 35/023* (2013.01); *C02F 1/32* (2013.01);
  (Continued)

(58) Field of Classification Search
  CPC ...... C02F 1/32; C02F 1/46; C02F 1/48; C02F 1/44; B01J 27/1815; B01J 35/023
  See application file for complete search history.

(56) References Cited

U.S. PATENT DOCUMENTS

| 5,174,877 A | 12/1992 | Cooper et al. |
| 5,292,704 A | 3/1994 | Lester |

(Continued)

FOREIGN PATENT DOCUMENTS

| AU | 2017210503 A1 | 3/2018 |
| CN | 101708883 A | 5/2010 |

(Continued)

OTHER PUBLICATIONS

Ross, F. and A.B. Ross, Selected specific rates of reactions of transients from water in aqueous solution. III. Hydroxyl radical and perhydroxyl radical and their radical ions. 1977: United States.

(Continued)

*Primary Examiner* — Cameron J Allen
(74) *Attorney, Agent, or Firm* — UConn IP Law Clinic; Robert Bertekap, III; Dorianne Salmon

(57) ABSTRACT

Disclosed herein is a method of treating an aqueous solution containing impurities including a perfluoroalkyl substance and/or a polyfluoroalkyl substance, comprising introducing the aqueous solution into a batch or semi-batch photocatalytic reactor with a microparticulate catalyst configured to reduce chain length of the perfluoroalkyl substance and/or polyfluoroalkyl substance, forming a treated aqueous stream, the reactor including a catalyst flow controller configured to automatically increase the catalyst concentration in the reactor while agitating the catalyst-containing solution during reaction, and removing catalyst particles from the treated aqueous stream to form a purified aqueous stream. In some cases, the feed to the reactor is atomized. Corresponding systems also are disclosed.

20 Claims, 24 Drawing Sheets

(51) Int. Cl.
   B01J 27/18   (2006.01)
   C02F 1/44    (2006.01)
   B01J 35/02   (2006.01)
   C02F 101/36  (2006.01)
(52) U.S. Cl.
   CPC ............ *C02F 1/44* (2013.01); *C02F 2101/36* (2013.01); *C02F 2301/046* (2013.01); *C02F 2305/10* (2013.01)

(56) References Cited

U.S. PATENT DOCUMENTS

| | | |
|---|---|---|
| 5,462,674 A | 10/1995 | Butters et al. |
| 6,238,574 B1 | 5/2001 | Cesa et al. |
| 6,518,442 B1 | 2/2003 | Felix et al. |
| 6,613,941 B1 | 9/2003 | Felix et al. |
| 6,627,173 B2 | 9/2003 | Hemme et al. |
| 6,991,733 B2 | 1/2006 | Kin et al. |
| 6,992,042 B2 | 1/2006 | Hemme et al. |
| 7,018,541 B2 | 3/2006 | Hintzer et al. |
| 7,795,332 B2 | 9/2010 | Hintzer et al. |
| 8,038,938 B2 | 10/2011 | Cabello et al. |
| 8,466,231 B2 | 6/2013 | Dadalas et al. |
| 9,284,201 B2 | 3/2016 | Kambala et al. |
| 9,896,350 B2 | 2/2018 | Gu et al. |
| 10,125,317 B2 | 11/2018 | Sugano et al. |
| 2002/0030021 A1 | 3/2002 | Pappa et al. |
| 2004/0134847 A1 | 7/2004 | Lin |
| 2006/0157425 A1 | 7/2006 | Rice et al. |
| 2011/0220584 A1 | 9/2011 | Johnson et al. |
| 2012/0211432 A1 | 8/2012 | Lean et al. |
| 2013/0200303 A1 | 8/2013 | Pancras et al. |
| 2014/0076819 A1 | 3/2014 | Zhang et al. |
| 2015/0274541 A1 | 10/2015 | Jeppson et al. |
| 2016/0355409 A1 | 12/2016 | Gondal et al. |
| 2016/0355411 A1 | 12/2016 | Fahs, II |
| 2017/0297926 A1 | 10/2017 | Nickelsen et al. |
| 2018/0072594 A1 | 3/2018 | Unger et al. |
| 2018/0282530 A1 | 10/2018 | O'Shea et al. |
| 2018/0319685 A1 | 11/2018 | Ball et al. |
| 2019/0031535 A1 | 1/2019 | Gondal et al. |
| 2019/0144319 A1 | 5/2019 | Luciano |

FOREIGN PATENT DOCUMENTS

| | | | |
|---|---|---|---|
| CN | 106219666 A * | 12/2016 | |
| CN | 108264127 | 7/2018 | |
| CN | 106219666 | 3/2019 | |
| EP | 1686095 A1 | 8/2006 | |
| EP | 1844851 A1 * | 10/2007 | ............ C10G 11/18 |
| JP | 2018187543 A | 11/2018 | |
| WO | WO-9424229 A1 * | 10/1994 | ............ C10G 11/187 |
| WO | WO2011/018514 A1 | 2/2011 | |
| WO | WO-2011017194 A2 * | 2/2011 | ............ B01J 19/26 |
| WO | WO-2011160186 A1 * | 12/2011 | ............ A61L 2/10 |
| WO | WO2013/119121 A1 | 8/2013 | |
| WO | WO-2015042280 A1 * | 3/2015 | ............ B01J 8/1827 |
| WO | WO2017/180346 A1 | 10/2017 | |
| WO | WO2017/210752 A1 | 12/2017 | |
| WO | WO2017/218335 A1 | 12/2017 | |
| WO | WO2018/027273 A1 | 2/2018 | |
| WO | WO2018/035474 A1 | 2/2018 | |
| WO | WO2018/053630 A1 | 3/2018 | |
| WO | WO2018/097875 A1 | 5/2018 | |

OTHER PUBLICATIONS

Saleh, N.B., et al., Removal of poly- and per-fluoroalkyl substances from aqueous systems by nano-enabled water treatment strategies. Environmental Science: Water Research & Technology, 2019. 5(2): p. 198-208.

Shao, T., et al., Photocatalytic decomposition of perfluorooctanoic acid in pure water and sewage water by nanostructured gallium oxide. Applied Catalysis B: Environmental, 2013. 142-143: p. 654-661.

Wang, S., et al., Photocatalytic degradation of perfluorooctanoic acid and perfluorooctane sulfonate in water: A critical review. Chemical Engineering Journal, 2017. 328: p. 927-942.

Wang, W., et al., Photocatalytic reductive defluorination of perfluorooctanoic acid in water under visible light irradiation: the role of electron donor. Environmental Science: Water Research & Technology, 2020. 6(6): p. 1638-1648.

Xu Hua, Ouyang Shuxin, Liu Lequan, Reunchan Pakpoom, Umezawa Naoto, and Ye Jinhua. Recent advances in TiO2-based photocatalysis. J. Mater. Chem. A. Jun. 16, 2014, 2: 12642-12661. https://doi.org/10.1039/C4TA00941J.

Xu, C., et al., Platinum modified indium oxide nanorods with enhanced photocatalytic activity on degradation of perfluorooctanoic acid (PFOA). Journal of the Taiwan Institute of Chemical Engineers, 2017. 80: p. 761-768.

Yamijala, S.S.R.K.C., R. Shinde, and B.M. Wong, Real-time degradation dynamics of hydrated per- and polyfluoroalkyl substances (PFASs) in the presence of excess electrons. Physical Chemistry Chemical Physics, 2020. 22(13): p. 6804-6808.

Rahman, M. F., Peldszus, S., & Anderson, W. B. (2014). Behaviour and fate of perfluoroalkyl and polyfluoroalkyl substances (PFASs) in drinking water treatment: a review. Water research, 50, 318-340.

Merino, N., Qu, Y., Deeb, R. A., Hawley, E. L., Hoffmann, M. R., & Mahendra, S. (2016). Degradation and removal methods for perfluoroalkyl and polyfluoroalkyl substances in water. Environmental Engineering Science, 33(9), 615-649.

Zhuo, Q., Deng, S., Yang, B., Huang, J., Wang, B., Zhang, T., & Yu, G. (2012). Degradation of perfluorinated compounds on a boron-doped diamond electrode. Electrochimica Acta, 77, 17-22.

Li, Z., Zhang, P., Shao, T., Wang, J., Jin, L., & Li, X. (2013). Different nanostructured In2O3 for photocatalytic decomposition of perfluorooctanoic acid (PFOA). Journal of hazardous materials, 260, 40-46.

Schaefer, C. E., Andaya, C., Buran, A., Condee, C. W., Urtiaga, A., Strathmann, T. J., & Higgins, C. P. (2017). Electrochemical treatment of perfluorooctanoic acid and perfluorooctane sulfonate: Insights into mechanisms and application to groundwater treatment. Chemical Engineering Journal, 317, 424-432.

Park, S., Lee, L. S., Medina, V. F., Zull, A., & Waisner, S. (2016). Heat-activated persulfate oxidation of PFOA, 6: 2 fluorotelomer sulfonate, and PFOS under conditions suitable for in-situ groundwater remediation. Chemosphere, 145, 376-383.

Li, Z., Zhang, P., Shao, T., & Li, X. (2012). In2O3 nanoporous nanosphere: a highly efficient photocatalyst for decomposition of perfluorooctanoic acid. Applied Catalysis B: Environmental, 125, 350-357.

Carter, K. E., & Farrell, J. (2008). Oxidative destruction of perfluorooctane sulfonate using boron-doped diamond film electrodes. Environmental science & technology, 42(16), 6111-6115.

Li, M., Yu, Z., Liu, Q., Sun, L., & Huang, W. (2016). Photocatalytic decomposition of perfluorooctanoic acid by noble metallic nanoparticles modified TiO2. Chemical Engineering Journal, 286, 232-238.

Xu, B., Ahmed, M. B., Zhou, J. L., Altaee, A., Wu, M., & Xu, G. (2017). Photocatalytic removal of perfluoroalkyl substances from water and wastewater: Mechanism, kinetics and controlling factors. Chemosphere, 189, 717-729.

Bentel, M.J., et al., Defluorination of Per- and Polyfluoroalkyl Substances (PFASs) with Hydrated Electrons: Structural Dependence and Implications to PFAS Remediation and Management. Environmental Science & Technology, 2019. 53(7): p. 3718-3728.

Bloh, J.Z., A Holistic Approach to Model the Kinetics of Photocatalytic Reactions. Frontiers in Chemistry, 2019. 7: p. 128.

Cui, J., P. Gao, and Y. Deng, Destruction of Per- and Polyfluoroalkyl Substances (PFAS) with Advanced Reduction Processes (ARPs): A Critical Review. Environmental Science & Technology, 2020. 54(7): p. 3752-3766.

Huang, D., et al., Single-Atom Pt Catalyst for Effective C—F Bond Activation via Hydrodefluorination. ACS Catalysis, 2018. 8(10): p. 9353-9358.

(56) References Cited

OTHER PUBLICATIONS

Jiang, F., et al., Enhancement of photocatalytic decomposition of perfluorooctanoic acid on CeO2/In2O3. RSC Advances, 2016. 6(76): p. 72015-72021.

Jin, L., et al., Ferric ion mediated photodecomposition of aqueous perfluorooctane sulfonate (PFOS) under UV irradiation and its mechanism. Journal of Hazardous Materials, 2014. 271: p. 9-15.

Li, X., et al., Efficient Photocatalytic Decomposition of Perfluorooctanoic Acid by Indium Oxide and Its Mechanism. Environmental Science & Technology, 2012. 46(10): p. 5528-5534.

Margeta, Karmen, et al. Natural Zeolites in Water Treatment—How Effective is Their Use. INTECH Open Access Publisher, 2013.

Ochiai, T., Iizuka, Y., Nakata, K., Murakami, T., Tryk, D.A., Koide, Y., Morito, Y., and Fujishima, A. (2011). Efficient decomposition of perfluorocarboxylic acids in aqueous suspensions of a TiO2 photocatalyst with medium-pressure ultraviolet lamp irradiation under atmospheric pressure. Ind. Eng. Chem. Res. 50(19): 10943. https://doi.org/10.1021/ie1017496.

Qu Yan, Zhang Chaojie, Li Fei, Chen Jing, and Zhou Qi. Photoreductive defluorination of perfluorooctanoic acid in water. Water Research. May 2010, 44(9): 2939-2947. https://doi.org/10.1016/j.watres.2010.02.019.

Sahu et al., "Rapid degradation and mineralization of perfluorooctanoic acid by a new petitejeanite Bi3O (OH)(PO4)2 . . . " Environ. Sci. Technol. Lett., 2018, 5, 533-538.

Lin, H. et al., "Efficient sorption and removal of perfluoroalkyl acids (PFAAs) from aqueous solution by metal hydroxies . . .," Environ. Sci. Technol. 48, 10562-10569 (2015).

\* cited by examiner

535

Plot of PFHxA and PFHpA concentration over time, error bars are 95% Confidence Interval

WATER PURIFICATION APPARATUS AND METHOD

CROSS REFERENCE TO RELATED APPLICATIONS

This application claims priority to, and the benefit of, U.S. Provisional Patent Application No. 62/839,098 filed on Apr. 26, 2019, the contents of which are incorporated by reference herein in their entirety.

FIELD

This disclosure relates generally to a water purification system to remove organic and other impurities from the water stream, and more particularly to the removal of PFAS.

BACKGROUND

Per- or polyfluoroalkyl substances (PFAS) are a category of organic compounds consisting of at least one fully fluorinated carbon molecule. These carbon-fluorine bonds make the compounds particularly resilient due to their chemical and thermal stability and therefore make them difficult to degrade and/or destroy. Because of the high energy of the carbon-fluorine bonds (C—F, 531.5 kJ mol-1), the polyfluorinated compounds (PFCs) are resistant to oxidation, reduction, and biodegradation (Zhang et. al, 2013). The C—F bonds also make PFAS hydrophobic. As such, they are used in a variety of products such as non-stick or waterproof coatings, in paper plates, textiles, paints, and cookware. However, in recent years, it has been found that they are toxic and have been discovered in appreciable concentrations in animals, humans, and even the most remote bodies of water. The presence of these substances is of increasing concern due to their toxicity to humans and their inability to naturally degrade in the environment. The main concern with PFAS is that they have been found in increasing concentrations in our drinking water and are known to bioaccumulate. Due to this, the EPA has set a safety advisory of 70 parts per trillion (ppt) as a maximum concentration for the presence of PFAS in drinking water.

Several different types of PFAS removal methods are generally known. They include sorption methods, advanced oxidation processes (AOPs), thermal-related processes, and other processes such as ball milling. Many of these methods suffer from various drawbacks, not all of them have a very high PFAS removal rate, some of them consume very high amount of energy, thermal processes are performed at a very high temperature which is not suitable for water purification plants, and some result in formation of waste with a very high concentration of PFAS which needs to be further disposed.

It would be useful to develop a method which is safe and efficient in terms of processing time, cost and removal of PFAS, generates non-toxic waste, and can be easily implemented into an existing plant.

SUMMARY

One embodiment described herein is a method of treating an aqueous solution containing impurities including a perfluoroalkyl substance and/or a polyfluoroalkyl substance, comprising introducing the aqueous solution into a batch or semi-batch photocatalytic reactor with a microparticulate catalyst configured to reduce chain length of the perfluoroalkyl substance and/or polyfluoroalkyl substance in the presence of UV light, forming a treated aqueous stream, the reactor including a catalyst flow controller configured to automatically increase the catalyst concentration in the reactor while agitating the catalyst-containing solution during reaction, and removing catalyst particles from the treated aqueous stream to form a purified aqueous stream.

Another embodiment described herein is a method of treating an aqueous solution containing impurities including a perfluoroalkyl substance and/or a polyfluoroalkyl substance, comprising combining the aqueous solution with a microparticulate catalyst configured to reduce chain length of the perfluoroalkyl substance and/or polyfluoroalkyl substance in the presence of UV light to form a reactor feed stream, introducing the reactor feed stream into a batch or semi-batch photocatalytic reactor through a spray nozzle, agitating the contents of the reactor to induce reaction, forming a treated aqueous stream, and removing catalyst particles from the treated aqueous stream to form a purified aqueous stream. In some cases, the spray nozzle comprises a single-stream atomizer. In some cases, the spray nozzle is a two-component nozzle and a gas stream is mixed with the liquid stream.

A further embodiment is a water purification system comprising a batch or semi-batch photocatalytic reactor comprising an inlet configured to receive an aqueous feed stream and a catalyst, an outlet for a treated aqueous stream, a reaction vessel containing a UV light source and an agitator, and a catalyst concentration control system configured to automatically increase catalyst concentration in the reactor during the reaction. In some cases, the system includes a catalyst separator disposed proximate the reactor outlet configured to separate catalyst from the treated aqueous stream. In some cases, the system includes a spray nozzle configured to atomize the aqueous feed stream. In embodiments, the system includes a catalyst inlet disposed upstream from the spray nozzle in order to combine the aqueous feed steam and the catalyst before atomization. In some cases, the system comprises a filter disposed upstream from the photocatalytic reactor, the filter being configured to remove particles having a size greater than 0.5µ from the aqueous stream.

A further embodiment described herein is a method of removing halogenated hydrocarbons from a water stream, comprising: electrocoagulating the water stream containing chlorine dioxide, filtering the water stream after electrocoagulation to remove particles having a size of at least 0.5 micron, and passing the filtered water stream through a UV photocatalytic reactor. In some cases, the method includes bubbling ozone gas through the water stream while it is passing through the UV photocatalytic reactor Yet another embodiment described herein is a method of removing halogenated hydrocarbons from a water stream, comprising: electrocoagulating the water stream; filtering the water stream after electrocoagulation; and passing the filtered water stream through a UV photocatalytic reactor; and bubbling ozone gas through the water stream while it is passing through the UV photocatalytic reactor. In embodiments, the method further comprises, adjusting the pH of the water in the range of about 6 to about 8.

Another embodiment described herein is a method of removing halogenated hydrocarbons from a water stream, comprising: bypassing the water stream via a bypass line in between the electrocoagulator directly to the photocatalytic reactor; passing the water stream through a UV photocatalytic reactor; and bubbling ozone gas through the water stream while it is passing through the UV photocatalytic reactor. In embodiments, the method further comprises, adjusting the pH of the water in the range of about 6 to about 8.

A further embodiment is a water purification apparatus comprising, in series, but not necessarily adjacent, an electrocoagulator, and a photocatalytic reactor comprising a UV light source and Indium Oxide ($In_2O_3$) coated tubes. This embodiment can be with or without a bypass line in-between the electrocoagulator and the UV-photocatalytic reactor.

Another embodiment is a water purification apparatus comprising, in series, a filtration assembly configured to remove particles having a size of at least about 0.5 microns, a photocatalytic reactor comprising a set of membranes, at least one catalyst, and a catalyst controller ramping system. In embodiments, the feed stream is introduced to the reactor through a spray nozzle.

DETAILED DESCRIPTION

Figure 1:
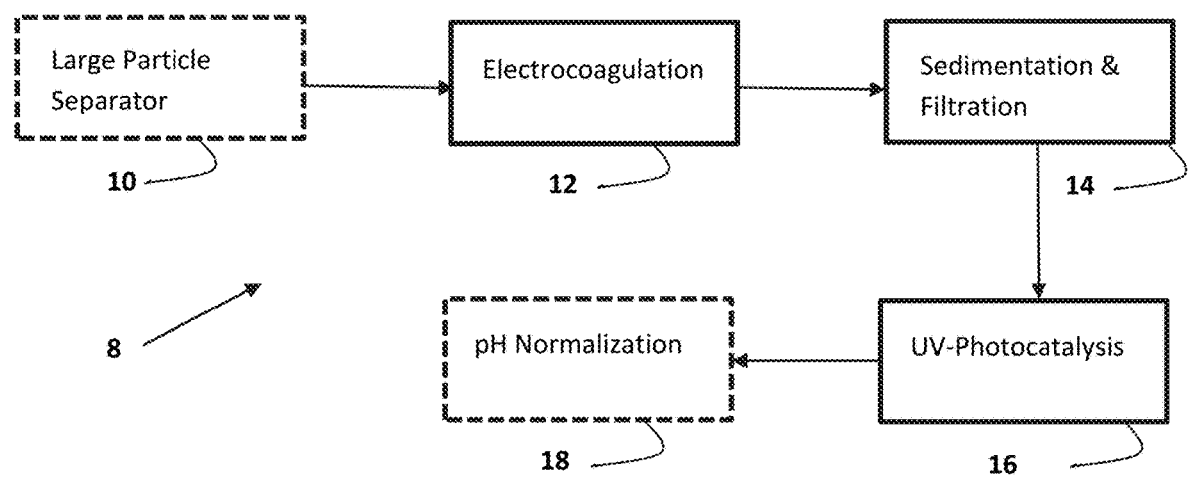
FIG. 1 is a block diagram of a system including electrocoagulation and UV-photocatalysis.

The main goal of the disclosed embodiments is to reduce the concentration of PFAS (perfluoroalkyl substances and polyfluoroalkyl substances) in drinking water, including PFOA (perfluorooctanoic acid) in drinking water using a water purification process. One embodiment uses an electrocoagulator and/or a UV-photocatalytic reactor so that the purified water may be safely consumed by the public. Another embodiment uses a photocatalytic reactor with ramping up of the catalyst concentration as a reaction proceeds. Yet another embodiment uses a photocatalytic reactor with atomization or misting of the feed stream. In some cases, the catalyst and the feed stream are pre-mixed before atomization or misting. A further embodiment uses a combination of ramping up the catalyst concentration as the reaction proceeds and atomization or misting of the feed stream.

Definitions

As used herein, the term "fluorinated" organic compound refers to an aliphatic or aromatic hydrocarbon in which at least one of the hydrogen atoms have been replaced by fluorine atoms. The term "aliphatic fluorinated organic compound" refers to an aliphatic or aromatic hydrocarbon in which at least one of the hydrogen atoms has been replaced by a fluorine atom.

As used herein, "ramping up the catalyst concentration" means increasing the catalyst concentration as a reaction proceeds in a batch or semi-batch reactor.

As used herein, PFOA refers to perfluorooctanoic acid and has the formula $C_8HF_{15}O_2$ PFOS refers to perfluorooctanesulfonic acid and has the formula $C_8HF_{17}O_3S$.

As used herein, GenX is a trade name (Chemours) for a technology that is used to make fluoropolymers (e.g., some nonstick coatings) without the use of perfluorooctanoic acid (PFOA). HFPO dimer acid and its ammonium salt are the primary chemicals associated with the GenX technology. HFPO dimer is hexafluoropropylene oxide dimer acid [(HFPO-DA)-2,3,3,3-tetrafluoro-2-(heptafluoropropoxy) propanoic acid and has the chemical formula $C_6HF_{11}O_3$.

Per- and polyfluoroalkyl substances (PFAS) are a group of man-made chemicals that includes but are not limited to PFOA, PFOS, and GenX, As used herein, PFHxA refers to perfluorohexanoic acid, and PFHpA refers to perfluoroheptanoic acid.

Current concentrations of PFAS in drinking water vary based on location and proximity to production plants that utilize this branch of chemicals; however, the EPA has recommended a standard maximum concentration of 70 parts per trillion (ppt). The embodiments disclosed herein relate to an apparatus and method that is economical, safe, and efficient in terms of processing time and cost, and can be incorporated into an existing plant to destroy toxic PFAS.

The removal of perfluorooctanoic acid (PFOA) from drinking water was modeled using remediation methods. PFOA is one of the most important and common constituents of PFAS. The advantage of the methods of the disclosed embodiments, is that the embodiments make use of more than one efficient water purification method to degrade PFOA to EPA accepted levels. The photocatalysis step of the method does not produce any harmful toxic waste. The process can be performed under a wide range of temperatures. Additionally, the method is very flexible in nature depending on the initial concentration of impurities in the water. If the impurity concentration in the initial water feed is less than 1,000,250,000 ppt (parts per trillion), then electrocoagulation and sedimentation/filtration steps can be bypassed. Another advantage of the current method is that it can be easily implemented into an existing water treatment plant.

In one of the embodiments, the combination of Electrocoagulation and Indium Oxide Photocatalysis achieves the desired removal of PFOA to 70 ppt within 1.5 hours, or in another embodiment the same combination achieves the desired removal of PFOA to 70 ppt within 5 hours, or in another embodiment the same combination achieves the desired removal of PFOA to 70 ppt within 2.5 hours. In embodiments the process is conducted at a temperature in the range of about 1° C. to about 9 9° C., or a temperature in the range of about 15° C. to about 50° C., or a temperature in the range of about 10° C. to about 65° C. In embodiments the initial pH of the water is in a range of about 2 to about 12, or about 4 to about 10, or about 5 to about 8. In embodiments, filtering the water stream after electrocoagulation removes particles having a size of at least 0.5 micron, or in another embodiment filtering the water stream after electrocoagulation removes particles having a size from 0.5 to 100 micron, or in another embodiment filtering the water stream after electrocoagulation removes particles having a size from 0.5 to 10 micron.

As used herein, the term "halogenated hydrocarbon" means p er- or polyfluoroalkyl substances (PFAS), and other halogenated impurities comprising chloroform, trichloroethane, carbon tetrachloride.

In some embodiments, the catalyst also decomposes non-halogenated hydrocarbons. In some cases, the process also kills microbes present in the liquid feed stream. In some cases, chlorine is added as a disinfectant.

The initial concentration of PFAS in groundwater is represented as consisting entirely of perfluorooctanoic acid (PFOA). This is due to focus on PFOA due to its health impacts and because PFOA is a good representative molecule of a large sub-class of PFAS.

Since the inlet concentration of PFOA was taken from a water treatment company, it is likely that this concentration comes from water that has already been treated with a typical drinking water treatment process. It is assumed that the concentration of PFOA remains unchanged from that of the raw water source.

The degradation of PFOA in one remediation process will continue seamlessly when the water reaches the next remediation process. In other words, the final concentration of PFOA from one remediation reactor will act as the initial concentration for the next downstream remediation reactor.

SolidWorks is a solid modeling computer-aided design (CAD) and computer-aided engineering (CAE) computer program that runs on Microsoft Windows. SolidWorks is a solid modeler and utilizes a parametric feature-based approach which was initially developed by PTC (Creo/Pro-Engineer) to create models and assemblies. The software is written on Parasolid-kernel.

Engineers and scientists worldwide use MATLAB® to analyze and design the systems and products transforming our world. MATLAB is in automobile active safety systems, interplanetary spacecraft, health monitoring devices, smart power grids, and LTE cellular networks. It is used for machine learning, signal processing, image processing, computer vision, communications, computational finance, control design, robotics, and much more. The MATLAB platform is optimized for solving engineering and scientific problems. The matrix-based MATLAB language is the world's most natural way to express computational mathematics. Built-in graphics make it easy to visualize and gain insights from data.

Referring to the drawings, FIG. 1 is a block diagram for a system and method involving a large particle separator 10, which can be optional, an electrocoagulator 12, a sedimentation and filtration unit 14, a UV-photocatalytic reactor assembly 16, and a pH adjustment tank 18, which can be optional. The key steps are electrocoagulation, sedimentation-filtration, and UV-photocatalysis.

Figure 2:
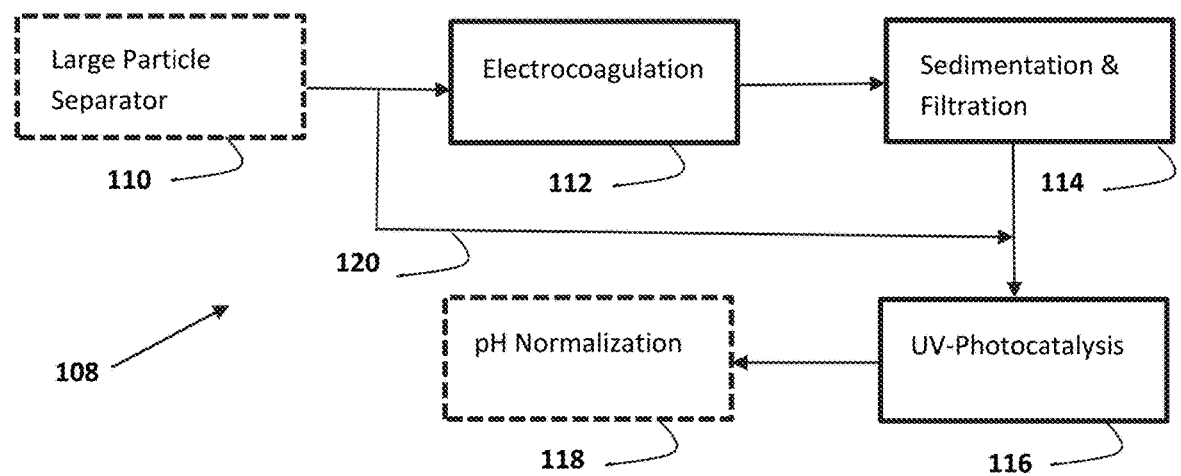
FIG. 2 is a block diagram of a system with a bypass line.

FIG. 2 is a block diagram for a system and method involving a large particle separator 110, which can be optional, an electrocoagulator 112, a sedimentation and filtration unit 114, a UV-photocatalytic reactor assembly 116, and a pH adjustment tank 118, which can be optional, this method involves a bypass line 120. Bypass line connects the large particle separator 110 directly to the UV-photocatalytic reactor 116. The key step is the UV-photocatalysis. The by-pass line 120 is used to by-pass the electrocoagulation (112) and sedimentation 114 step for purification of a water stream with less than 0.5% of PFAS concentration in the initial water feed.

Figure 3:
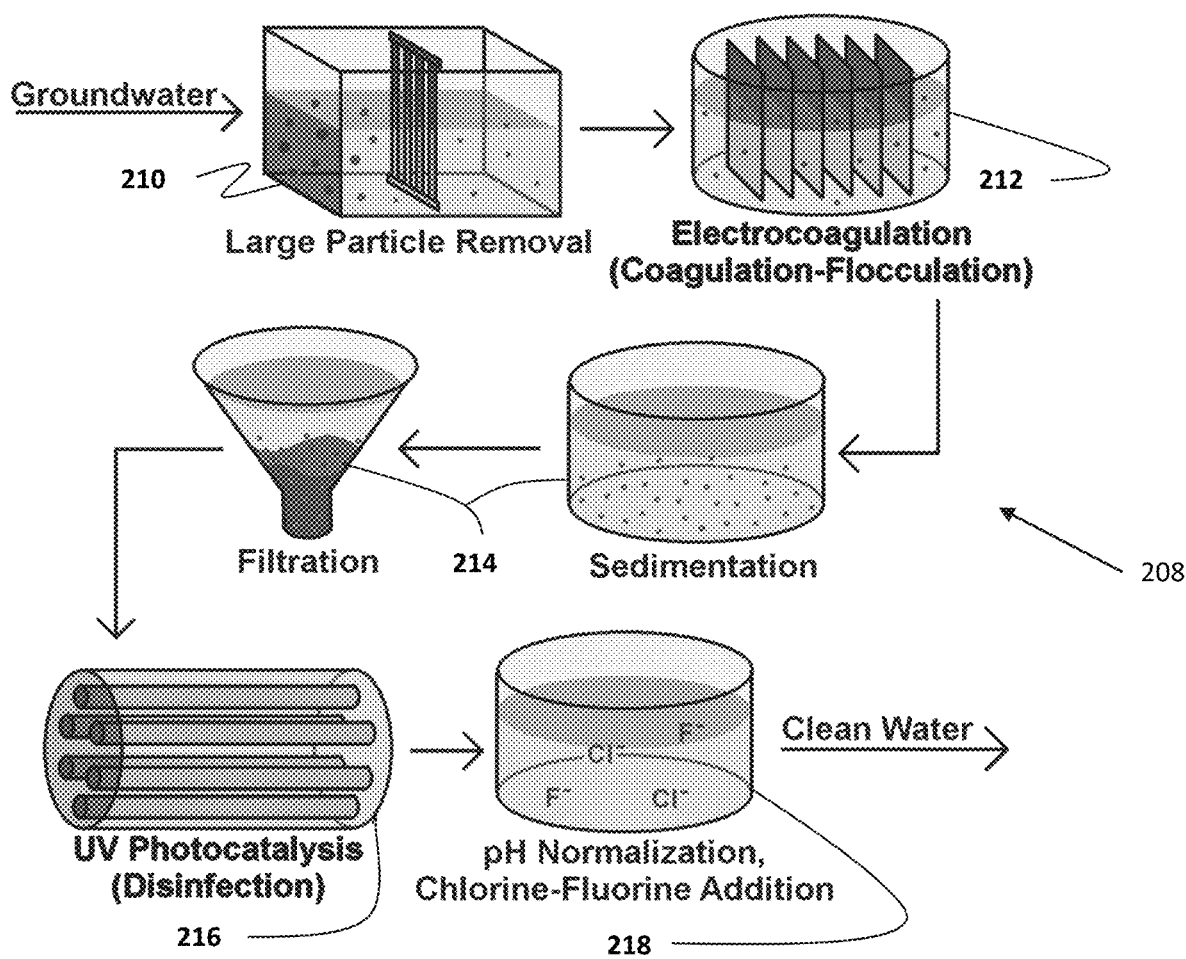
FIG. 3 is a schematic representation of an apparatus used for water purification.

FIG. 3 is a schematic representation of an apparatus used for water purification comprising, a large particle separator 210, which can be optional, an electrocoagulator 212 (for coagulation and flocculation), sedimentation/filtration or centrifugation and filtration or only filtration unit 214, a UV-photocatalytic reactor 216, and if required, a pH adjusting unit 218, which can be optional.

Figure 4:
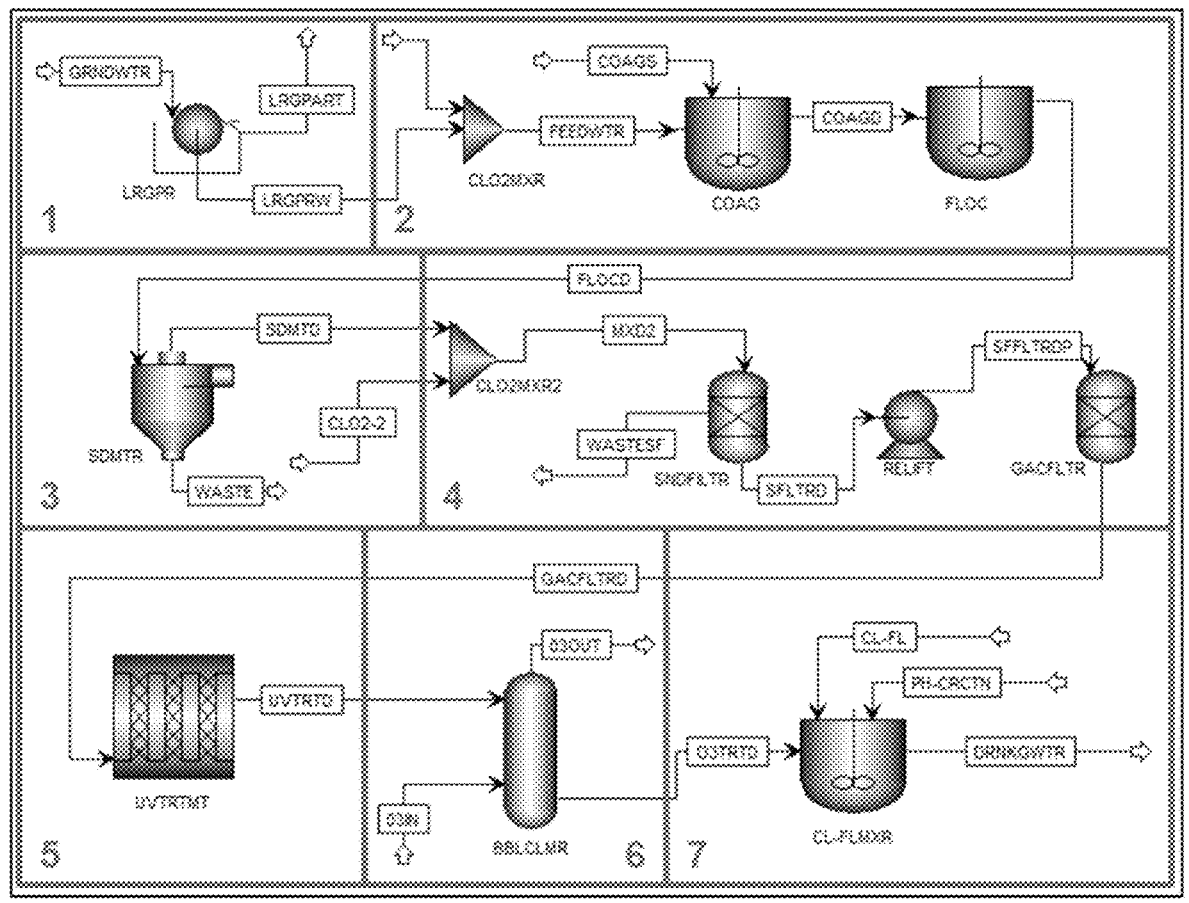
FIG. 4 depicts a flowchart showing various equipment and steps for a water purification method disclosed herein.

FIG. 4 depicts a flowchart showing various steps for a water purification method for some embodiments. The water stream is passed through a filtration unit in a Step 1 to remove large particles. This step can be optional depending on the mount of suspended particles in the stream of water. Step 2 involves coagulation and flocculation impurities are precipitated in this step. Optionally, the impurities are allowed to settle in step 3. The water stream is then passed through a filtration assembly in step 4 to remove precipitated solids. In step 5, the water stream is passed through a UV-photocatalytic reactor. In some embodiments, ozone, oxygen, or air is bubbled through the water stream while it is passing through a UV-photocatalytic reactor. Step 6 is sonolysis, which is an alternative to photocatalysis. The last step, step 7, is an optional step of pH normalization in the range of about 6 to about 8 and chlorine/fluorine addition.

Figure 5:
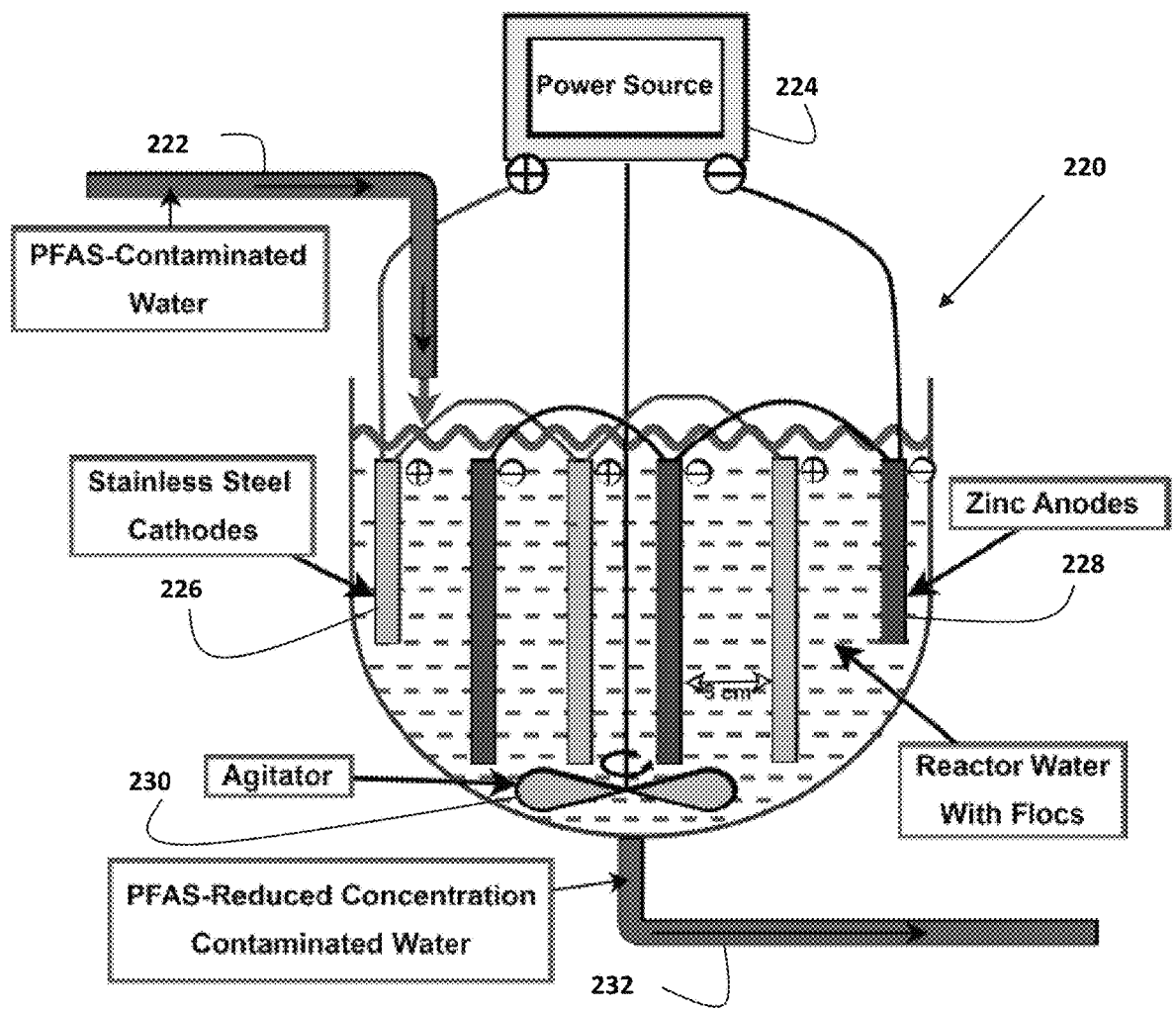
FIG. 5 shows the electrocoagulation reactor.

FIG. 5 shows one embodiment of an electrocoagulation reactor 220, with an inlet to feed PFAS-contaminated water 222, a power source 224, stainless steel cathodes 226, Zinc anodes 228, an agitator 230, and an outlet 232 to remove contaminated water with a reduced PFAS concentration.

Figure 6:
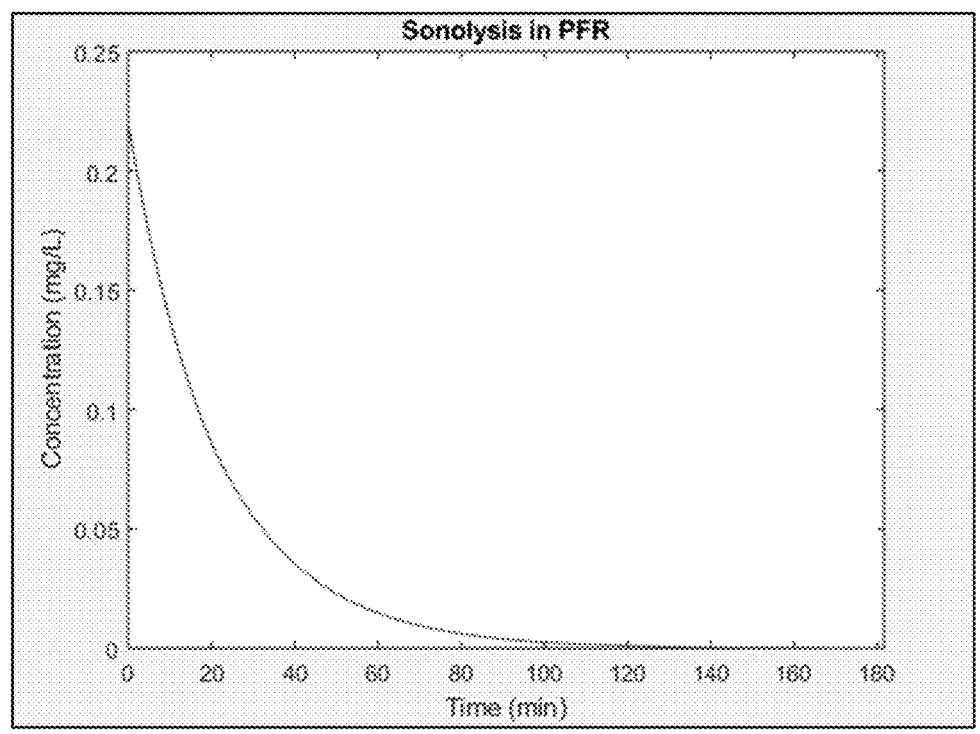
FIG. 6 shows perfluorooctanoic acid (PFOA) concentration over time for sonolysis in a plug flow reactor (PFR).
Figure 7:
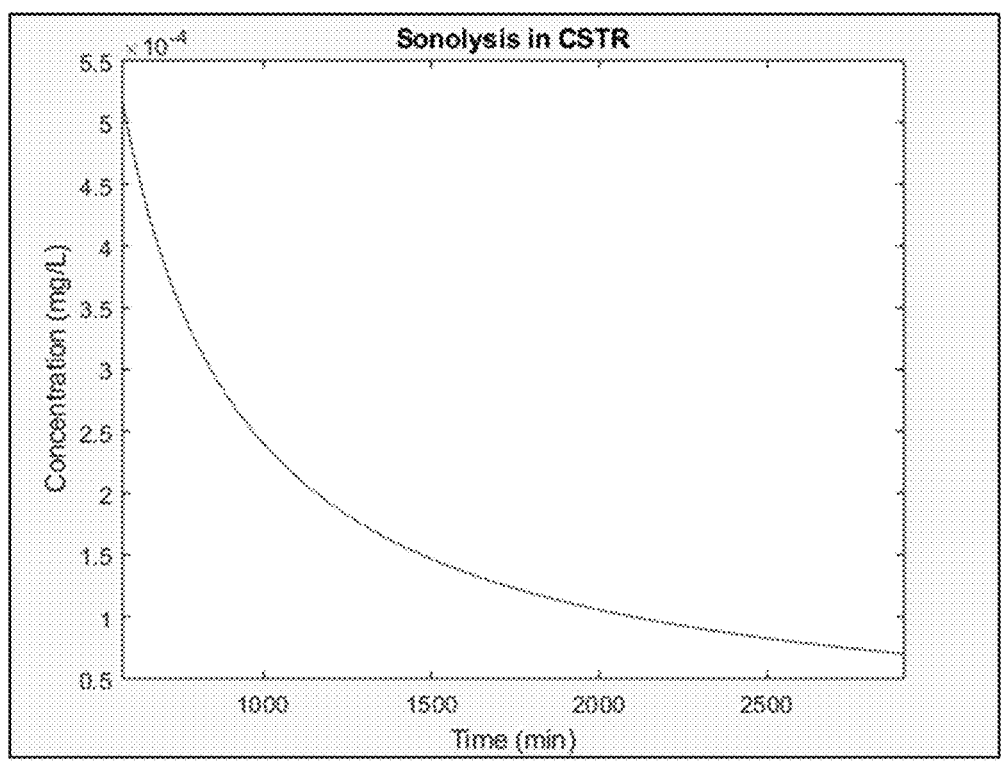
FIG. 7 shows PFOA concentration over time for sonolysis in a continuously-stirred tank reactor (CSTR).
Figure 8:
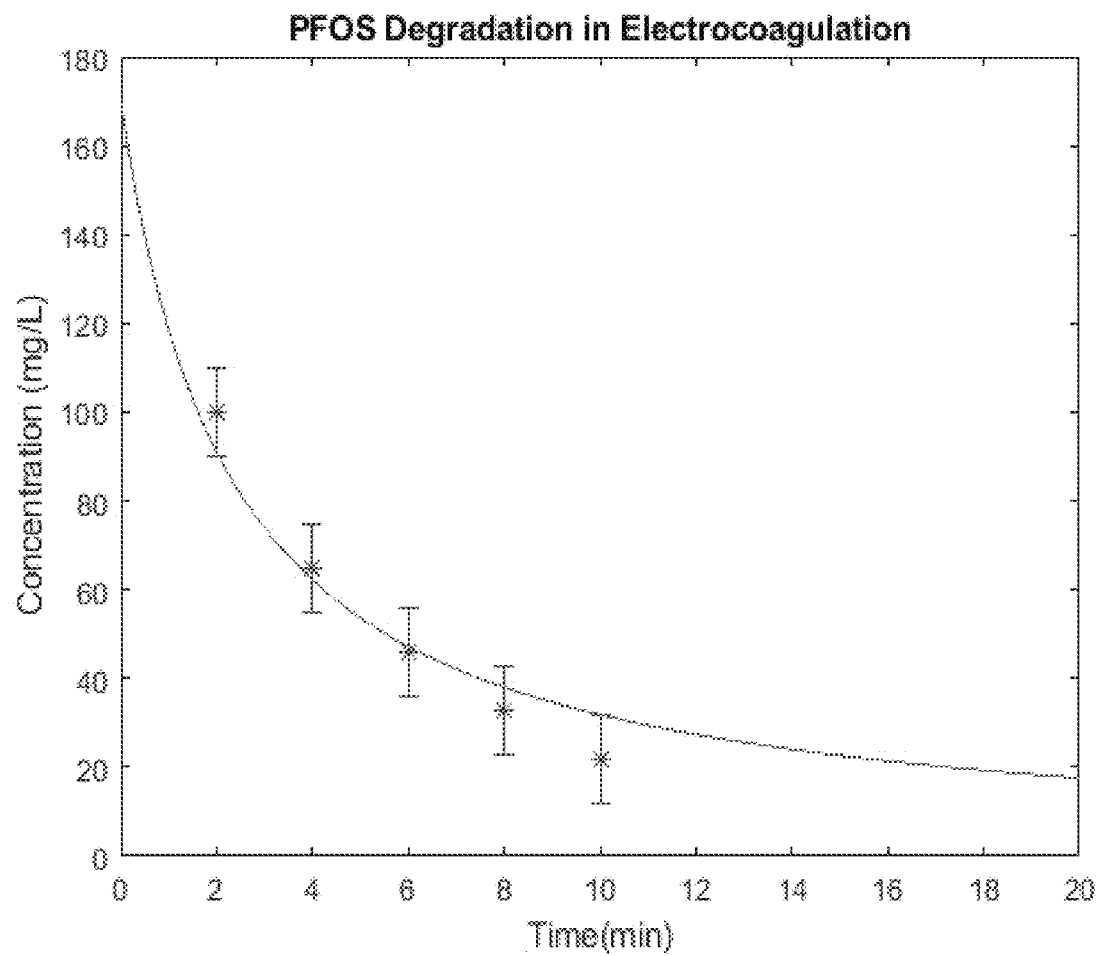
FIG. 8 shows Concentration of perfluorooctane sulfonate (PFOS) plotted against time, in minutes, for theoretical pseudo-second order reaction rates.
Figure 9:
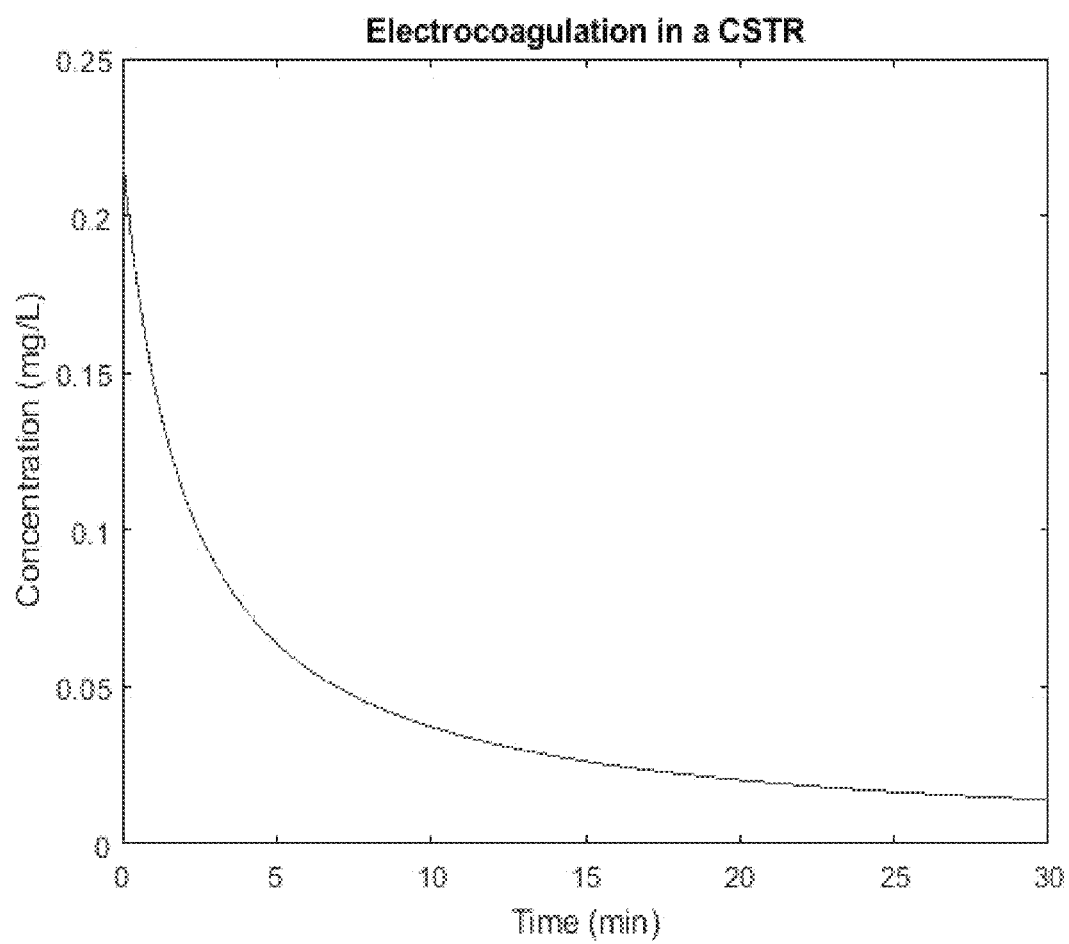
FIG. 9 shows PFOA concentration in electrocoagulation for a continuously stirred tank (CSTR) plotted against time.
Figure 10:
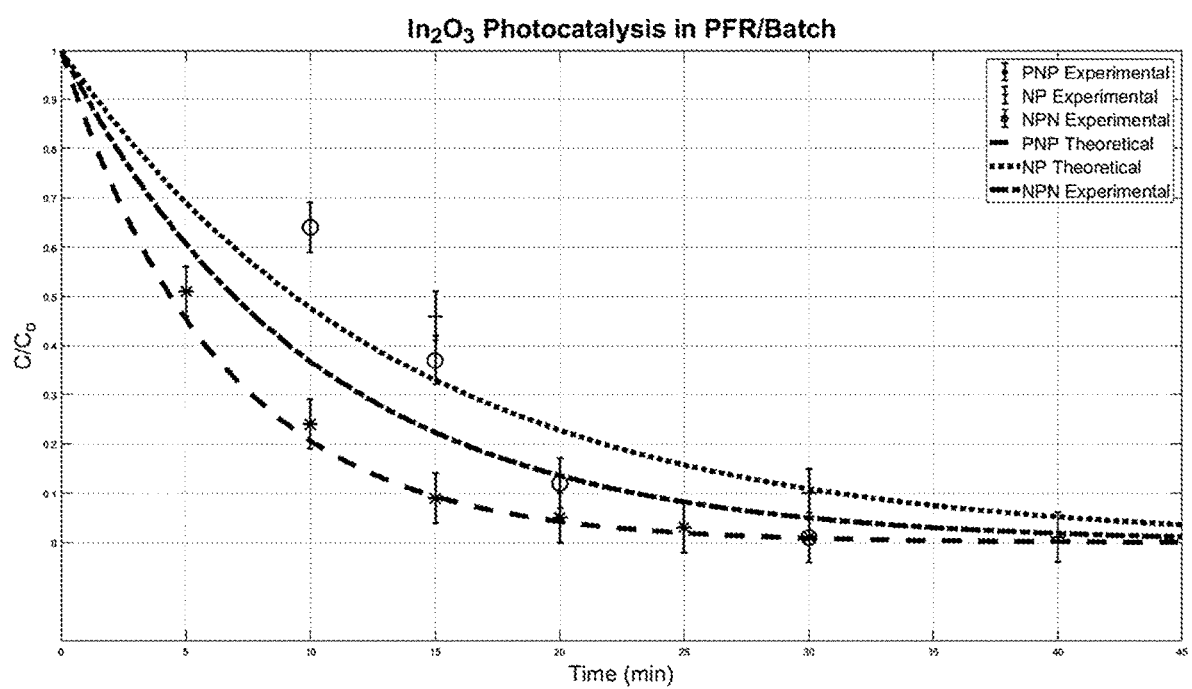
FIG. 10 shows concentration of PFOA divided by initial concentration plotted against time for theoretical pseudo-first order reaction rates of indium oxide photocatalysis and experimental data points.
Figure 11:
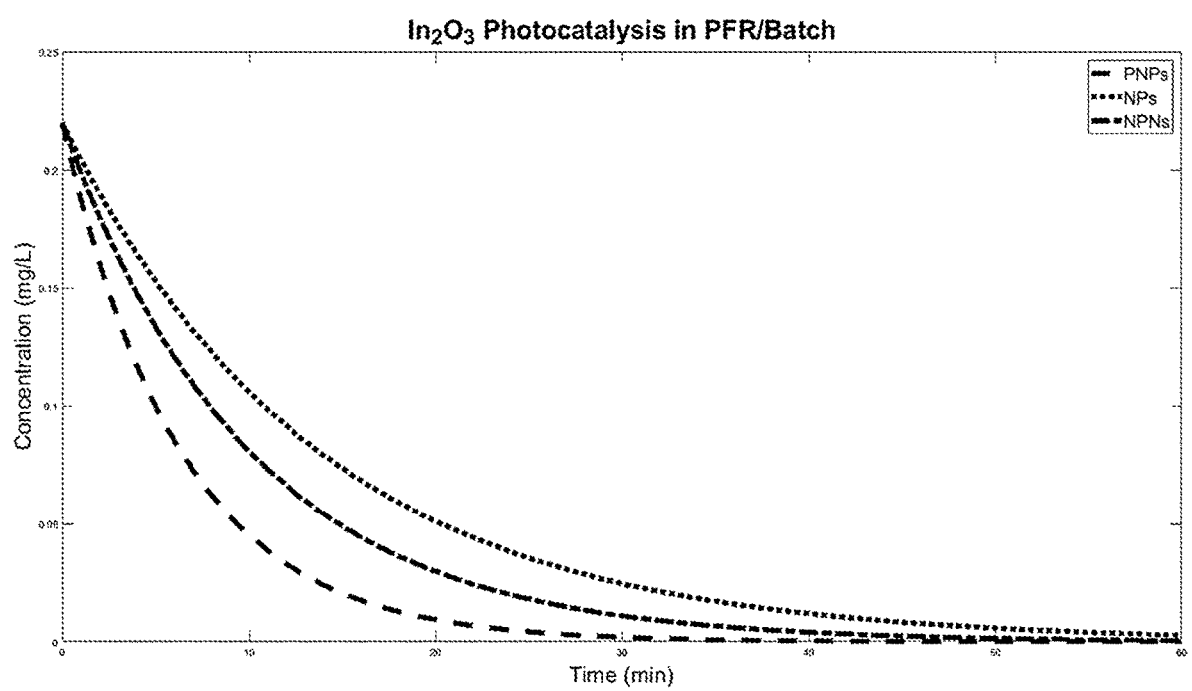
FIG. 11 shows PFOA concentration over time graph for indium oxide photocatalysis in a plug flow reactor (PFR) or batch reactor.
Figure 12:
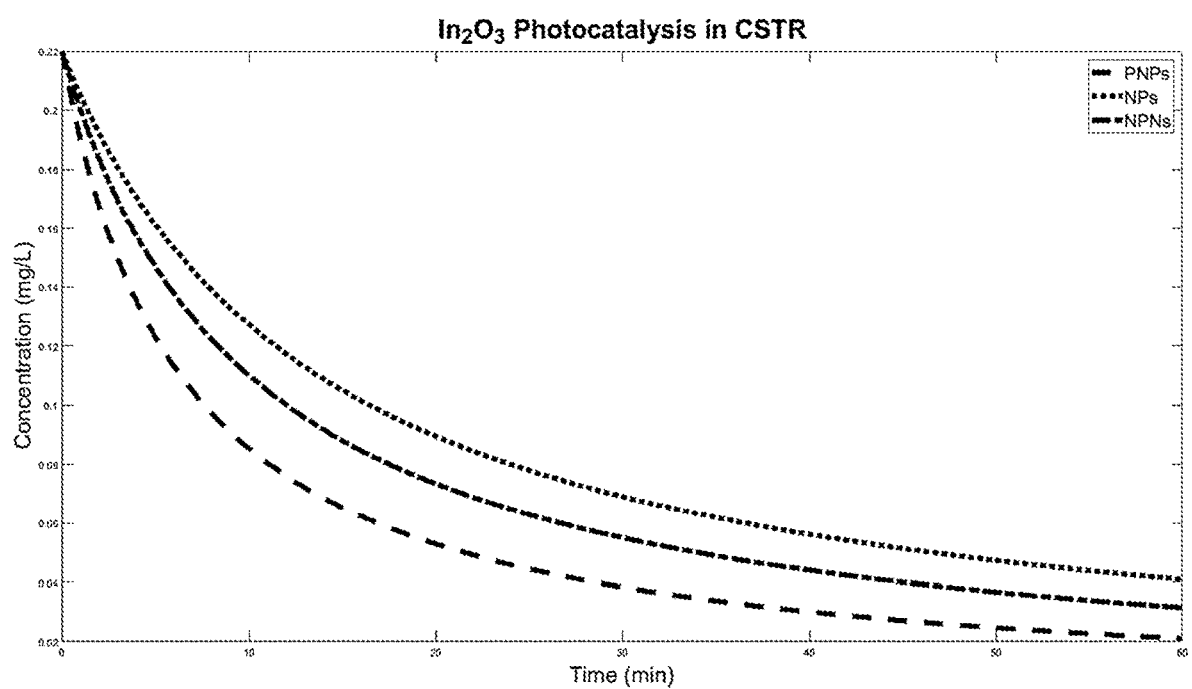
FIG. 12 shows PFOA concentration over time graph for indium oxide photocatalysis in a continuously stirred tank reactor (CSTR).
Figure 13A:
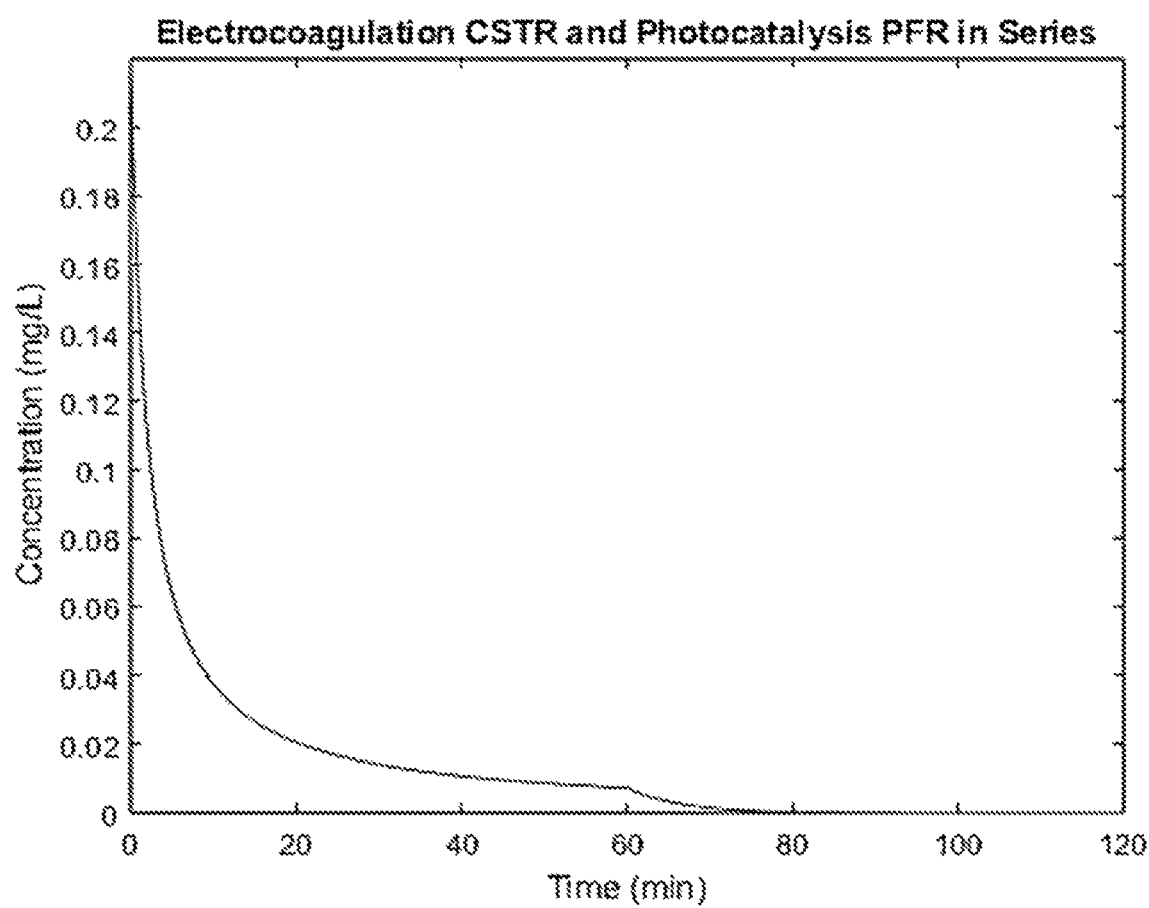
FIG. 13A shows Concentration of PFOA plotted against time for electrocoagulation and photocatalysis in series.
Figure 13B:
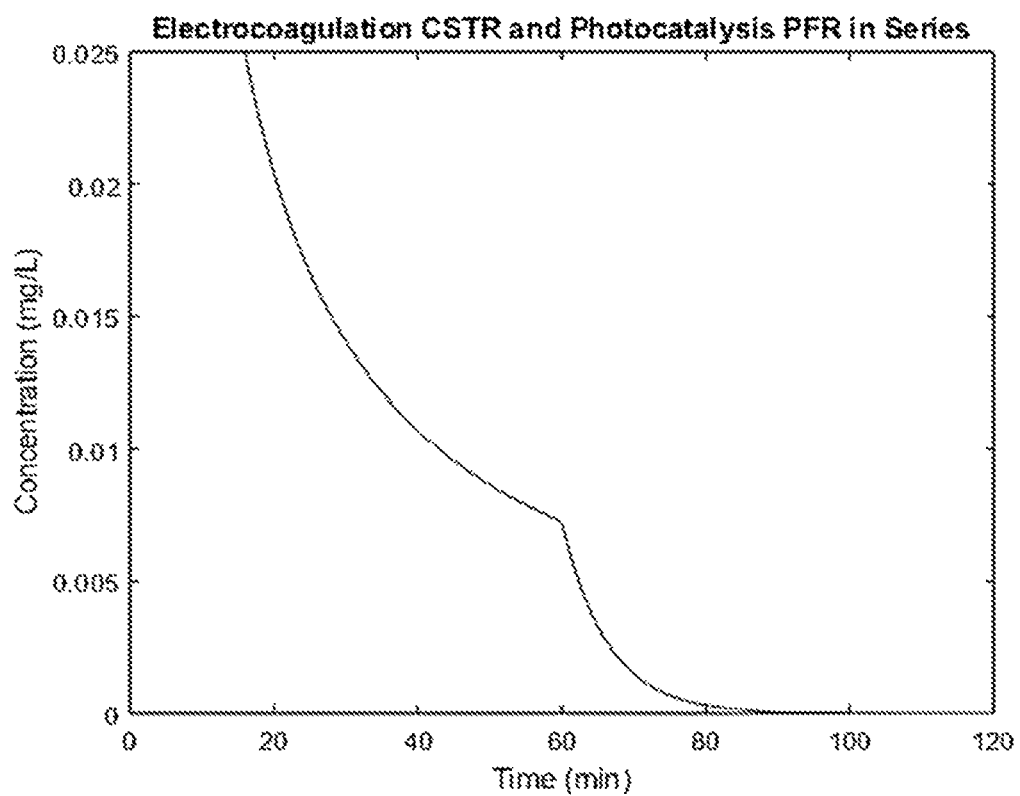
FIG. 13B shows FIG. 13A with zoomed-in y-axis for better visual clarity.

FIG. 6 shows PFOA concentration over time for sonolysis in a plug flow reactor (PFR). The graph ends where concentration has reached the 70 ppt goal. FIG. 7 shows PFOA concentration over time for sonolysis in a continuously-stirred tank reactor (CSTR). The x-axis does not start at 0, and the y-axis is multiplied by $10^{-4}$, which helps to visualize the tail end of this process to the point where 70 ppt is reached. FIG. 8 shows concentration of PFOS is plotted against time, in minutes, for theoretical pseudo-second order reaction rates with the experimental data points and the error bars. FIG. 9 shows PFOA concentration in electrocoagulation for a continuously stirred tank reactor (CSTR) plotted against time. FIG. 10 shows concentration of PFOA divided by initial concentration plotted against time for theoretical pseudo-first order reaction rates and experimental data points. Three different morphologies are shown for indium oxide photocatalysis in a plug flow reactor (PFR)/batch reactor. Error bars are ±0.5 units. FIG. 11 shows PFOA concentration over time graph for indium oxide photocatalysis in a plug flow reactor (PFR) or batch reactor. The different lines compare the effectiveness of three different morphologies of indium oxide. FIG. 12 shows PFOA concentration over time graph for indium oxide photocatalysis in a continuously stirred tank reactor (CSTR). The different lines compare the effectiveness of three different morphologies of indium oxide. FIG. 13*a* shows concentration of PFOA plotted against time for electrocoagulation and photocatalysis in series. FIG. 13*b* shows FIG. 13*a* with zoomed-in y-axis for better visual clarity.

Figure 14A:
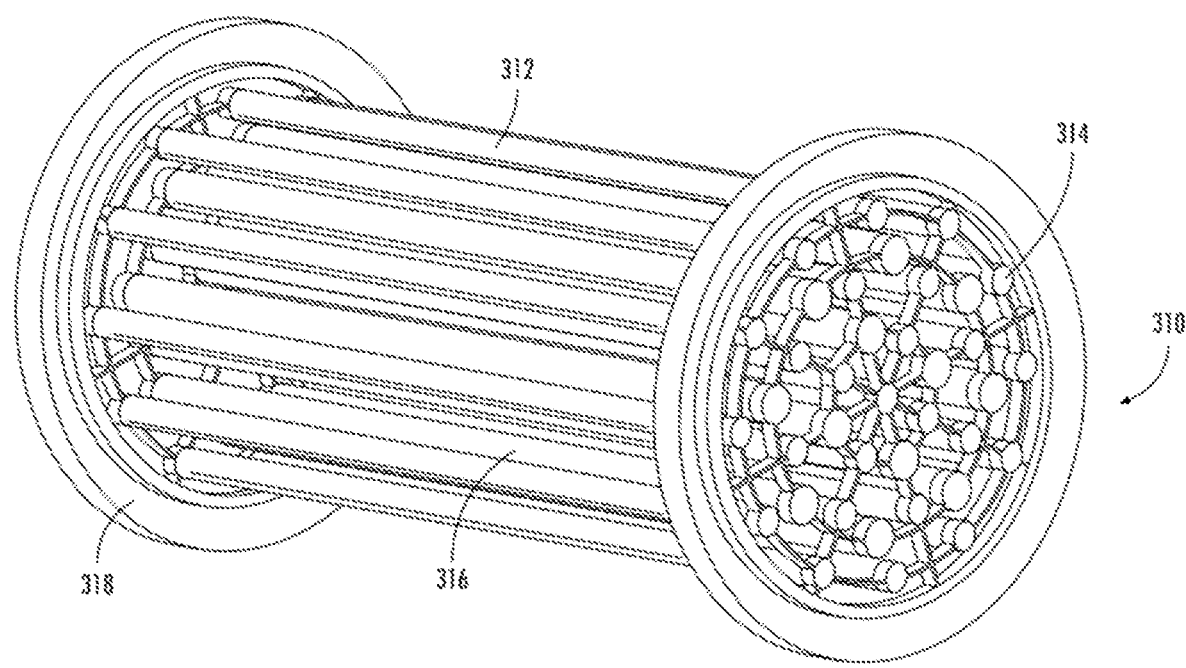
FIG. 14A shows a perspective view of a photocatalytic reactor.
Figure 14B:
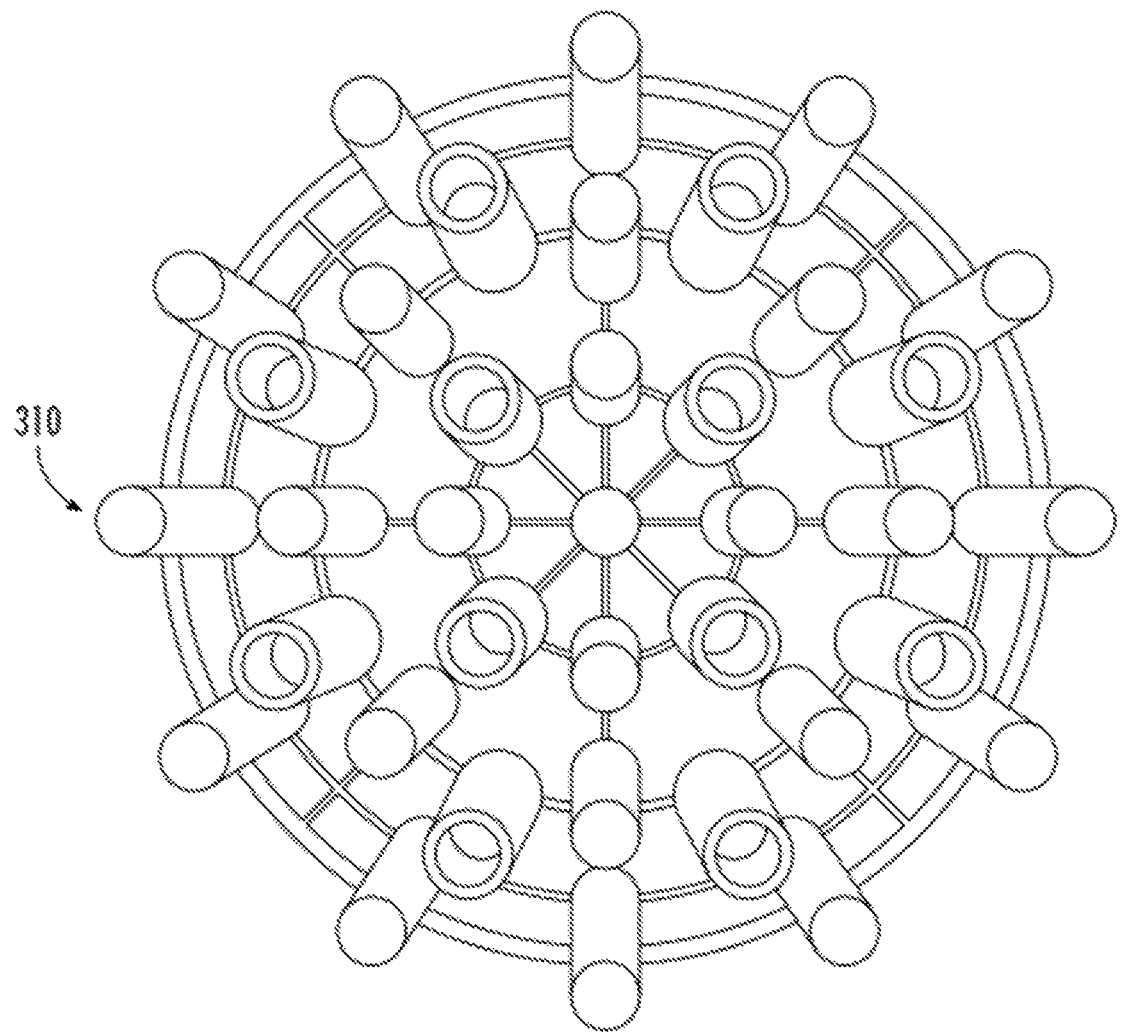
FIG. 14B shows a cross sectional top-down view of the photocatalytic reactor without casing.

FIG. 14*a* shows one embodiment of a photocatalytic reactor 310, with UV source in a form of UV lights encased in UV-transmitting casing 312, grates to allow flow of water through the reactor 314, rods/tubes coated with $In_2O_3$ catalyst 316, and casing coated with a reflective material 318. FIG. 14*b* shows an angled view of one embodiment of a photocatalytic reactor 310. FIG. 14*c* shows a side view of one embodiment of a photocatalytic reactor 310. FIG. 14*d* shows a cross-sectional top-down view of one embodiment of a photocatalytic reactor 310 without casing 318.

Figure 15:
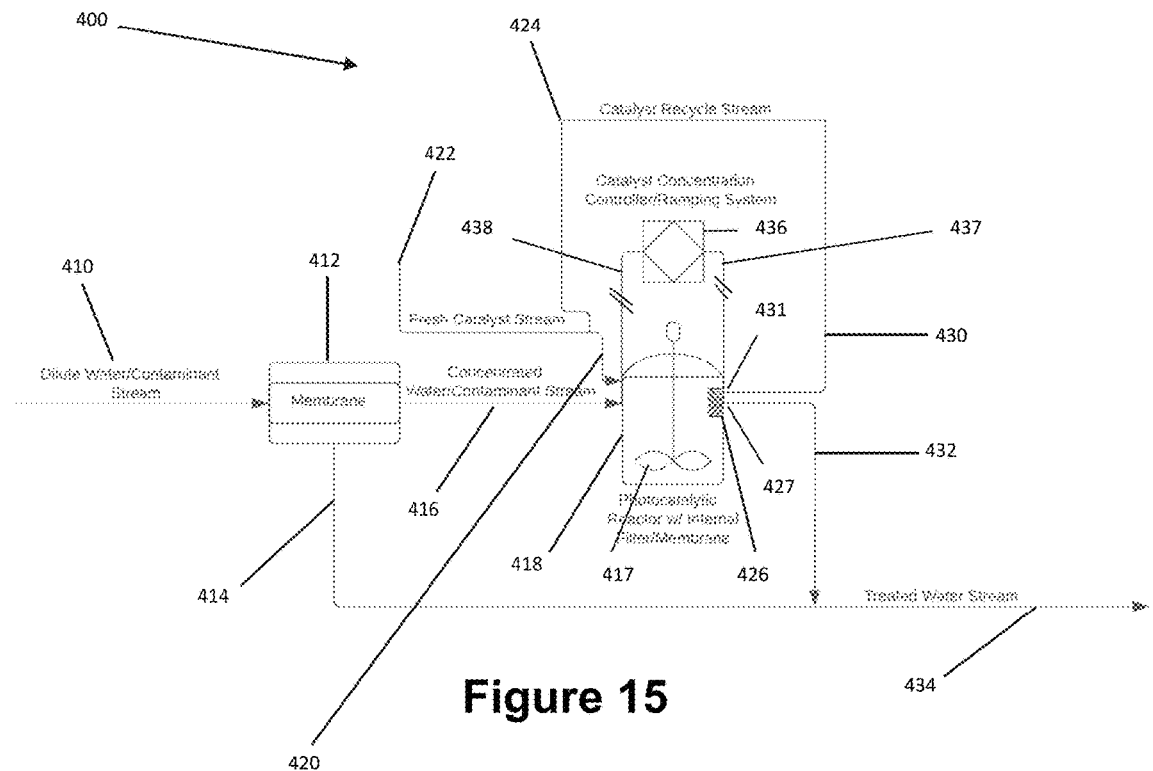
FIG. 15 depicts a system and method for purifying a stream using a batch photocatalytic reactor with a catalyst ramping system.
Figure 16:
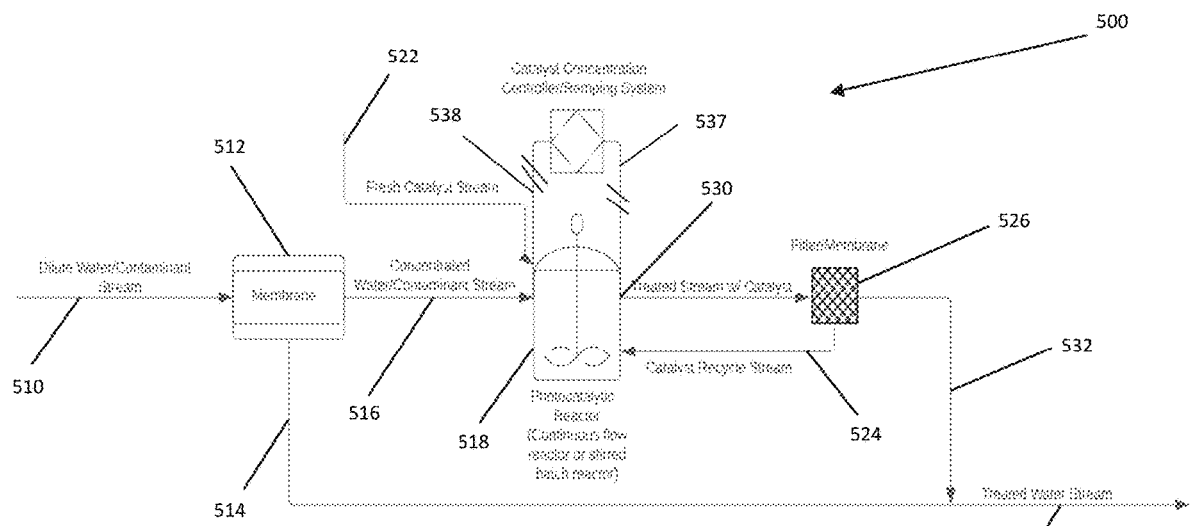
FIG. 16 depicts a system and method for purifying a stream using a batch photocatalytic reactor with a feed stream atomizer.

FIGS. 15 and 16 show an embodiment without the use of electrocoagulation or tubes coated with a catalyst. These reactors, which can be a stirred or semi-batch slurry reactor contain a microparticulate catalyst, and/or a nanoparticulate catalyst, and optionally may be set up in parallel and/or in series with other reactors of the same type to achieve a pseudo-steady flow.

Referring to FIG. 15, the overall process is designated as 400. A contaminated liquid feed stream 410 passes through a membrane 412 from which a first purified liquid stream 414 is removed. Impurities are then concentrated in a liquid contaminant stream 416, which is fed to a photocatalytic reactor 418 at a reactor inlet 419. A catalyst feed stream 420, which contains a mixture of fresh catalyst in stream 422 and recycled catalyst in stream 424 enters the reactor 418 separately from the liquid contaminant stream 416 through a catalyst inlet 421. In the reactor, which contains a UV light source of the type shown in FIGS. 20 and 24 and an agitator 417, the contaminants with carbon chains of C8 or longer are broken down into organic compounds having carbon chains or C6 or smaller. A purified stream passes through a membrane filter 426 at the reactor outlet 427. The catalyst does not pass through the filter and removed through catalyst outlet 431 and is recycled via stream 424 to be combined with fresh catalyst from stream 422 in stream 420. The treated water stream 432 is removed through a reactor outlet 427 and is mixed with the purified liquid stream 414 to form treated water stream 434. The concentration of catalyst in the reactor is automatically increased during the reactor through the use of a catalyst concentration controller 436. Electrical lines 437 and 438 control the relative flow rates of the catalyst and the aqueous liquid feed.

Referring to FIG. 16, the overall process shown therein is designated as 500. A contaminated liquid feed stream 510 passes through a membrane 512 from which a first purified liquid stream 514 is removed. Impurities are then concentrated in a liquid contaminant stream 516, which is fed to a photocatalytic reactor 518. A catalyst feed stream 520, which contains a mixture of fresh catalyst in stream 522 and recycled catalyst in stream 524 enters the reactor 518 separately from the liquid contaminant stream 516. In the reactor 518, which contains a UV light source of the type shown in FIGS. 20 and 24, and an agitator 517, the contaminants with carbon chains of C8 or longer are broken down into organic compounds having carbon chains or C6 or smaller. A purified stream passes through a membrane filter 526 positioned downstream from the reactor outlet 530. The catalyst does not pass through the filter and is recycled via stream 528 to the reactor 518. The treated water stream 532 is mixed with the purified liquid stream 514 to form treated water stream 534. Electrical lines 537 and 538 control the flow rate of the catalyst feed at the reactor inlet.

Figures 17, 18:
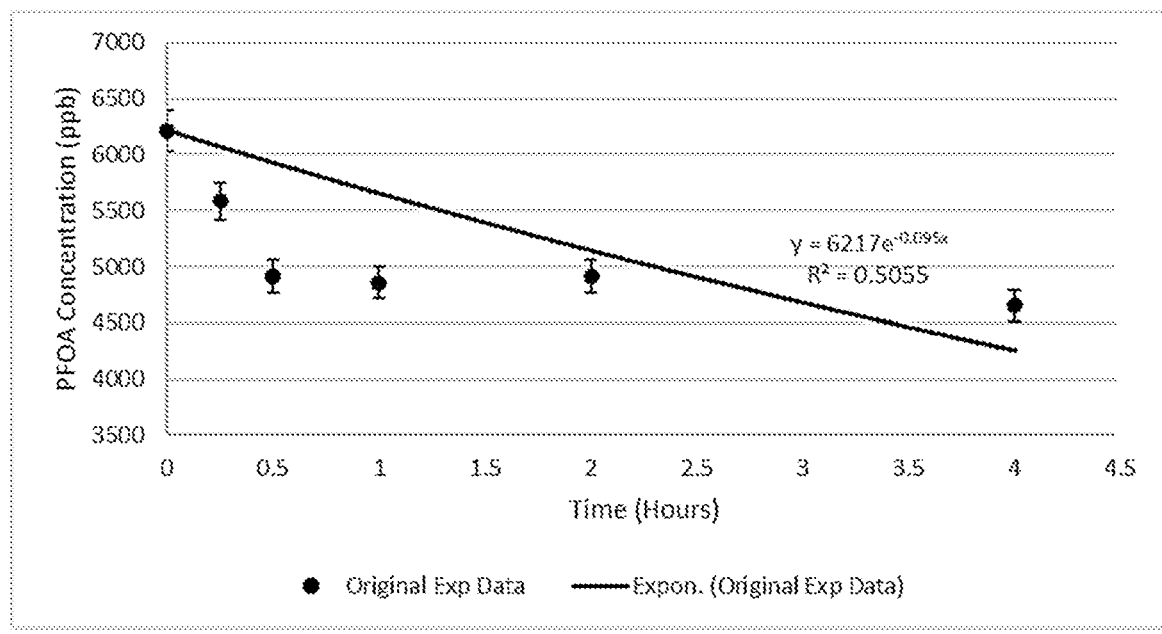
FIG. 17 shows a line drawing of a batch reactor setup.
FIG. 18 depicts a plot of time vs PFOA concentration.
Figure 19:
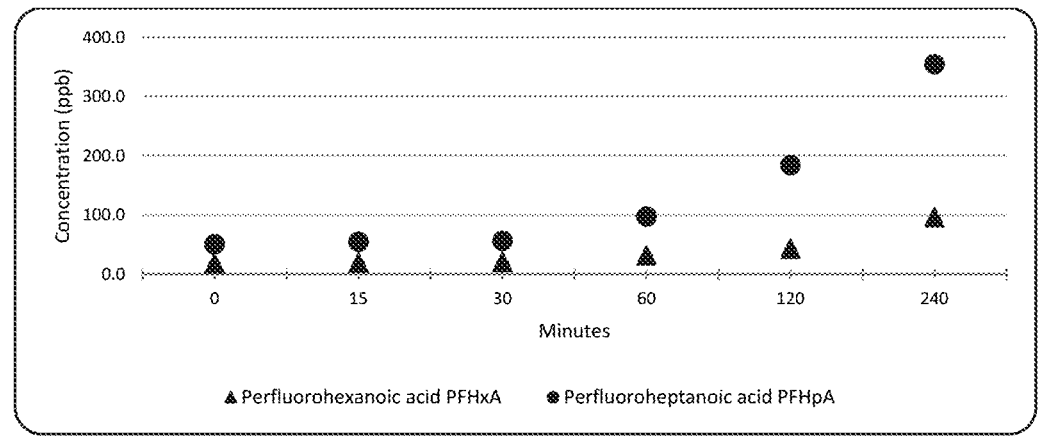
FIG. 19 depicts a plot of PFHxA and PFHpA concentration over time.

FIG. 17 shows a line drawing of a batch reactor setup 535 on a 30-gallon scale to evaluate using bismuth oxyhydroxyphosphate (BOHP) as the photocatalyst. FIG. 18 depicts the results as a plot of time vs PFOA concentration with error bars at a 95% confidence interval. The trendline is exponential with an equation of $y=6217*e^{-0.095x}$. FIG. 19 depicts a plot of perfluoroheptanoic acid (PFHpA) and perfluorohexanoic acid (PFHxA) concentration over time.

Figure 20:
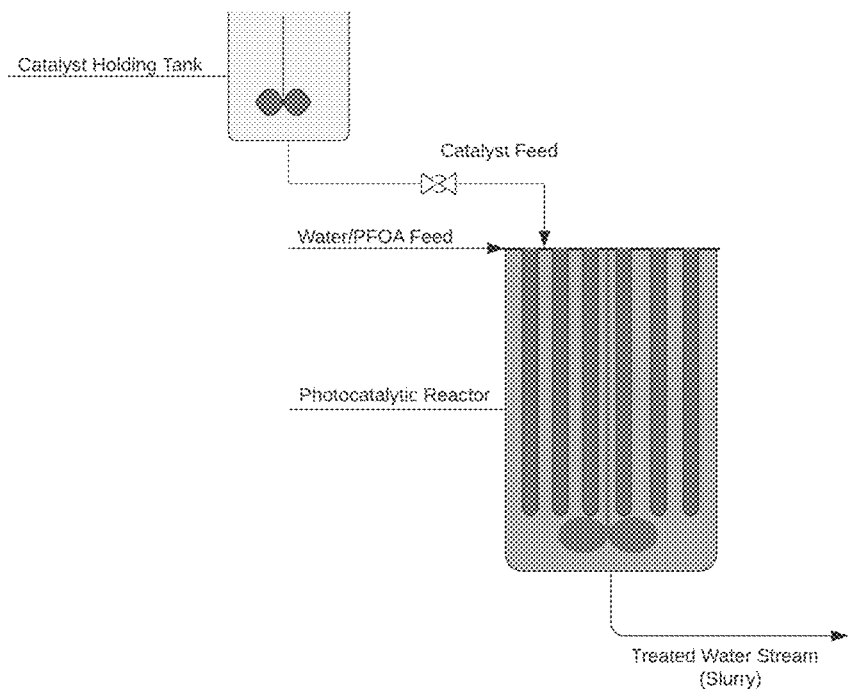
FIG. 20 shows a diagram of a catalyst ramping system setup.
Figure 21A:
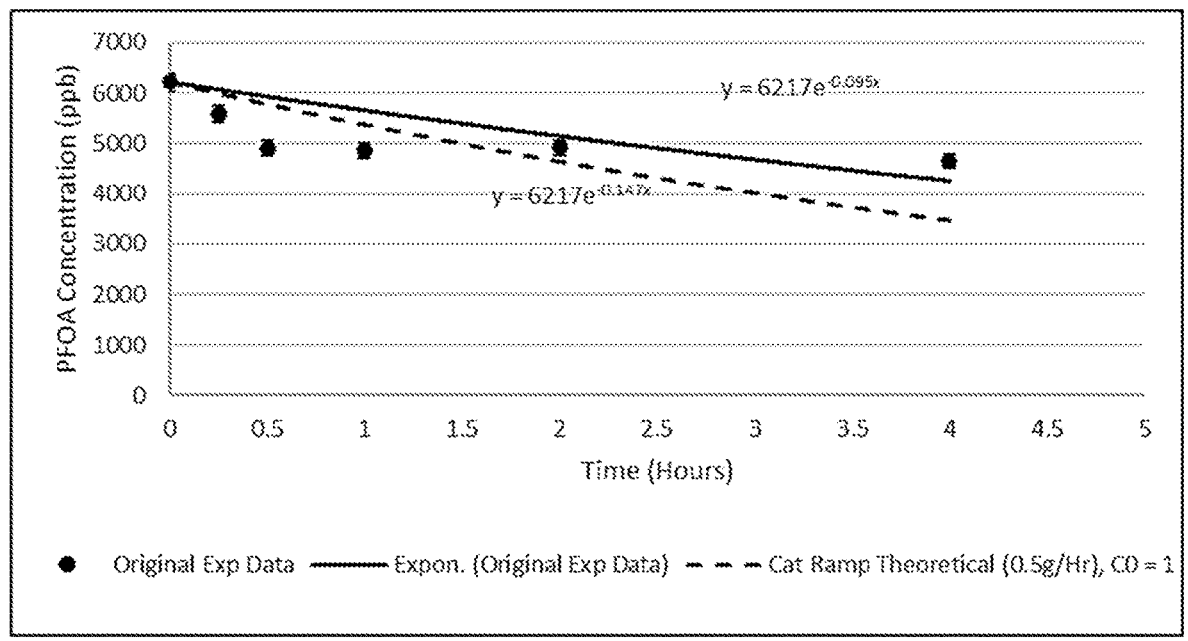
FIGS. 21A-21D depict plots of time vs PFOA concentration.
Figure 21B:
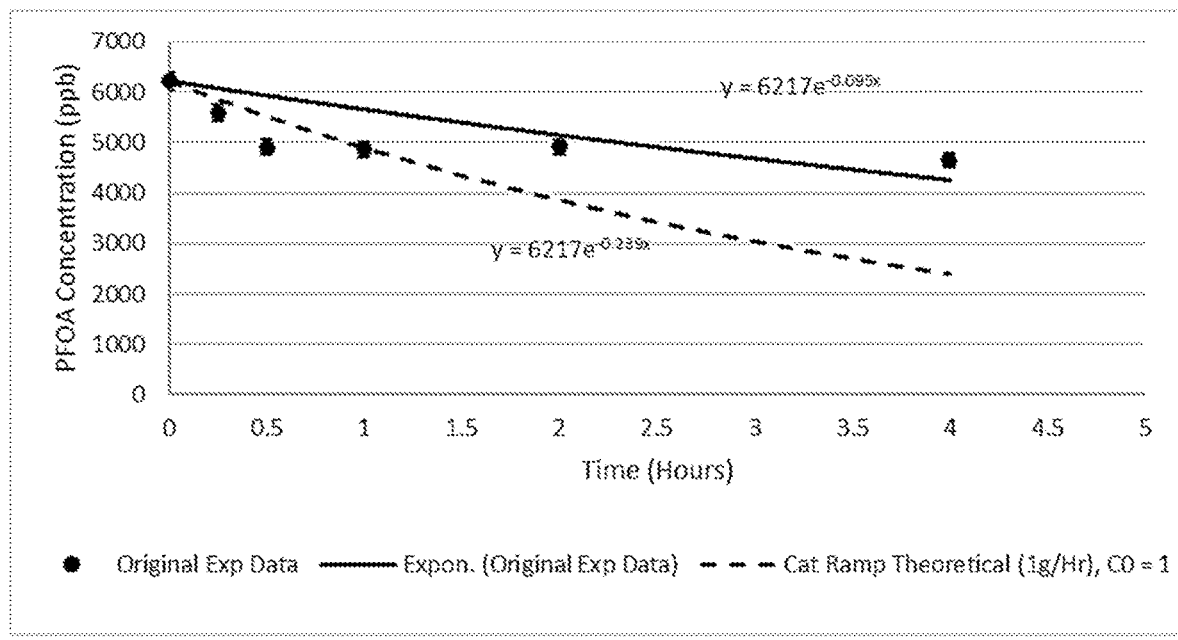
Figure 21C:
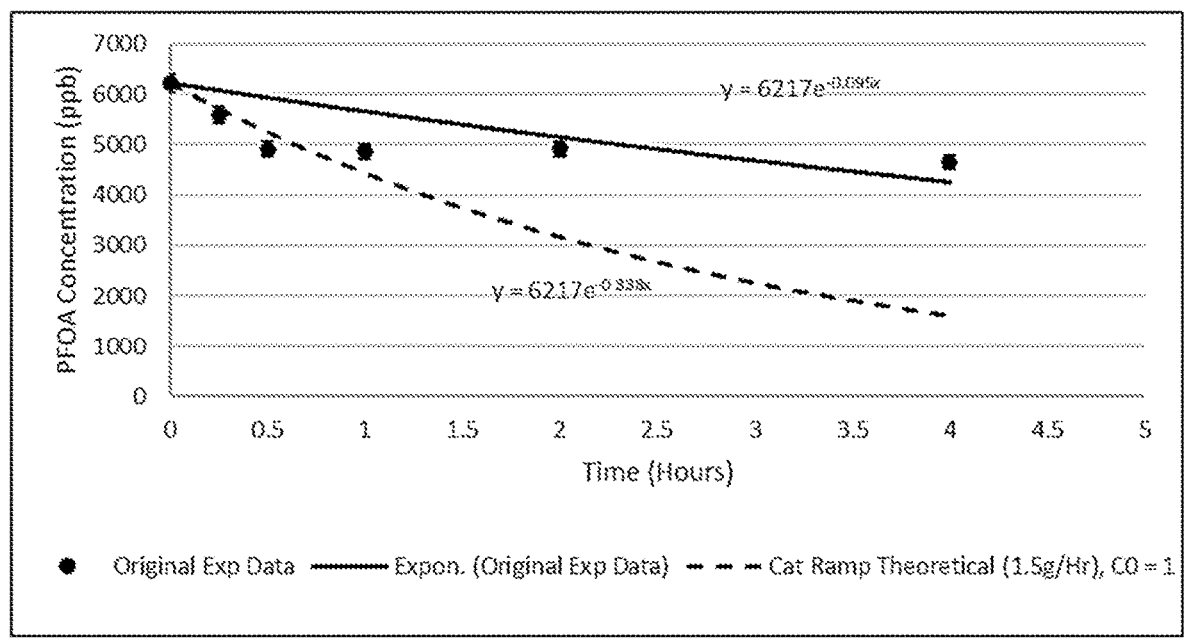
Figure 21D:
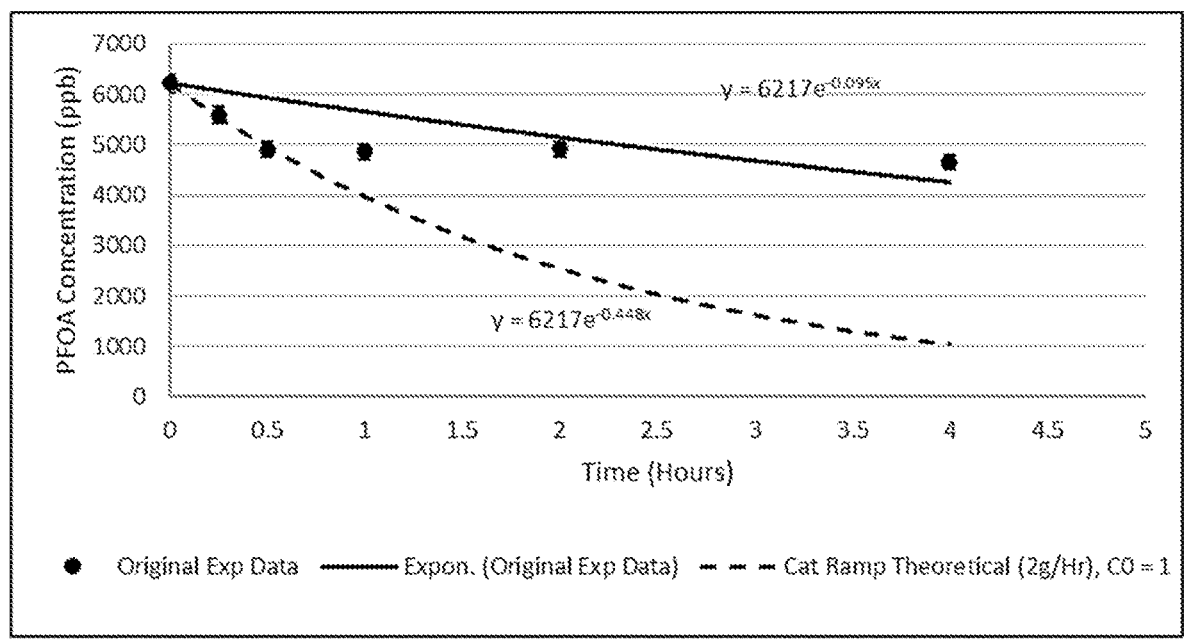

FIG. 20 shows a diagram of a catalyst ramping system setup. FIGS. 21A-21D depict the results as plots of time vs PFOA concentration with error bars at a 95% confidence interval. The corresponding trendline (solid) is exponential with an equation of $y=6217*e^{-0.095x}$. The dashed trendlines show the expected improvement of the catalyst ramping system at various rates.

Figure 22:
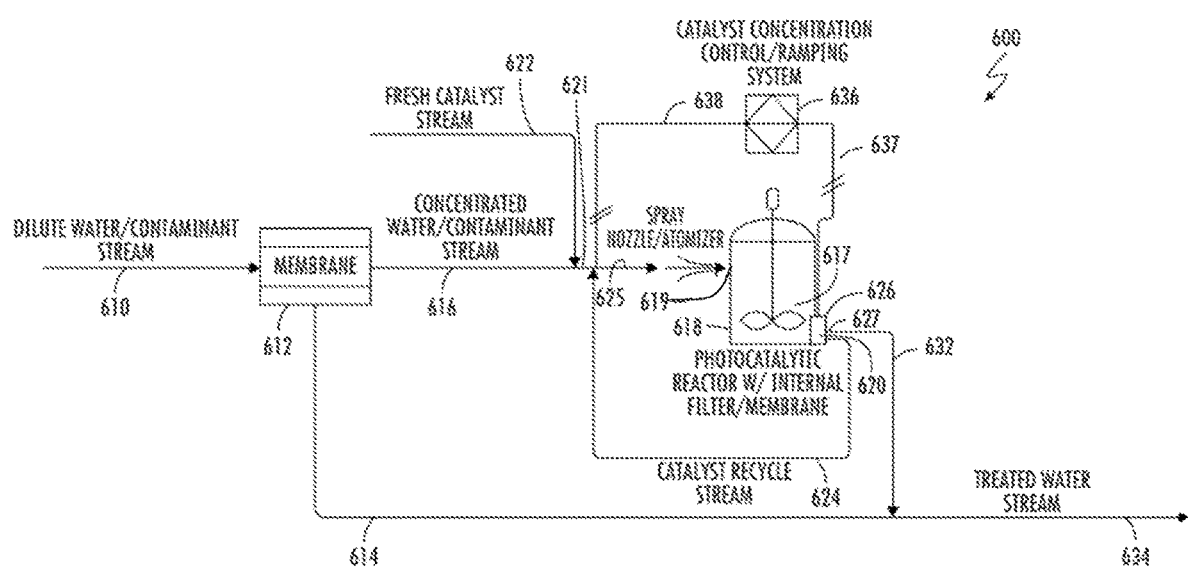
FIG. 22 depicts a system and method using a photocatalytic reactor with an internal filter.
Figure 23:
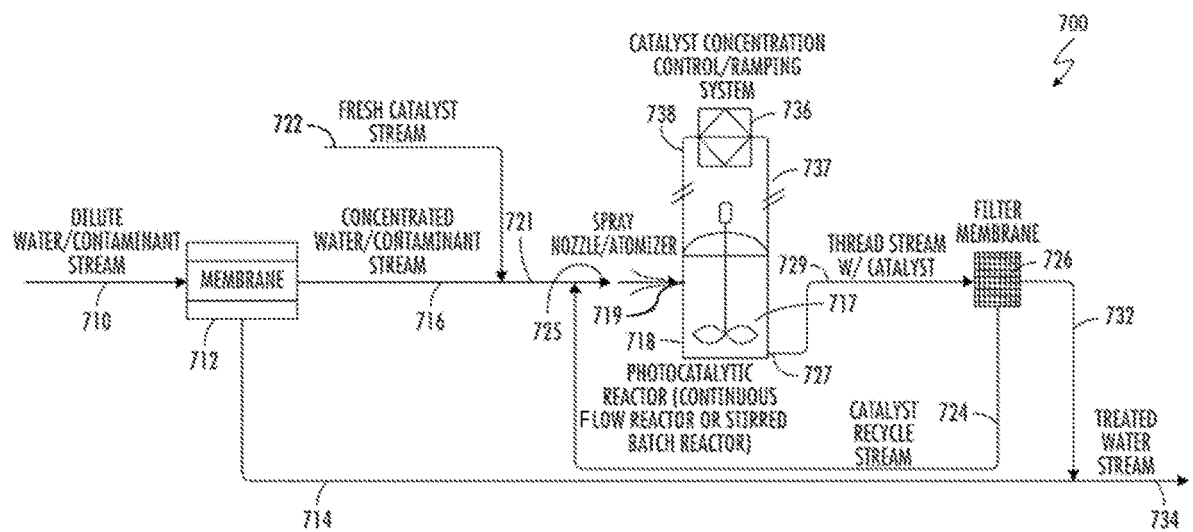
FIG. 23 depicts a system and method including a photocatalytic reactor with an external filter and a side feed atomizer.

FIGS. 22 and 23 show embodiments that include a spray nozzle or atomizer at the reactor inlet. The process is similar to that shown in FIGS. 15-16, however, feeds are mixed and fed to a spray nozzle or atomizer before entering the reactor. A contaminated spray/mist is then fed into the reactor and the treated condensate is collected at the bottom and filtered through either an internal or external filter. More specifically, FIG. 22 shows an overall process generally designated as 600. A contaminated liquid feed stream 610 passes through a membrane 612 from which a first purified liquid stream 614 is removed. Impurities are then concentrated in a liquid contaminant stream 616, which is fed to a photocatalytic reactor 618 at a reactor inlet 619. A fresh catalyst feed stream 622 is combined with the liquid contaminant stream 616 to form stream 621. A catalyst recycle stream 624 from the reactor 618 is combined with stream 621 to form reactor feed stream 625, which enters the reactor at reactor inlet 619. In the reactor, which contains a UV light source similar to that shown in FIGS. 20 and 24, and an agitator 617, the contaminants with carbon chains of C8 or longer are broken down into organic compounds having carbon chains or C6 or smaller. A purified liquid stream 632 exits a membrane filter 626 and leaves the reactor 618 at the reactor outlet 627. The catalyst does not pass through the filter 626, is removed through a catalyst outlet 620 and recycled via stream 624 to be combined with fresh catalyst from stream 622 and the liquid contaminant stream 616. The treated water stream 632 is mixed with the purified liquid stream 614 to form treated water stream 634. The concentration of catalyst in the reactor is automatically increased during the reaction through the use of a catalyst concentration controller 636. Electrical lines 637 and 638 control the relative flow rates of the catalyst feeds and the aqueous liquid feed.

Referring to FIG. 23, the overall process shown therein is designated as 700. A contaminated liquid feed stream 710 passes through a membrane 712 from which a first purified liquid stream 714 is removed. Impurities are then concentrated in a liquid contaminant stream 716, which is fed to a photocatalytic reactor 718 at a reactor inlet 719. The reactor 718 contains a UV light source similar to that shown in FIGS. 20 and 24 and an agitator 717. A fresh catalyst feed stream 722 is combined with the liquid contaminant stream 716 to form stream 721. Recycled catalyst stream 724 is combined with stream 721 to form reactor feed stream 725. The reactor feed stream 725 enters the reactor at reactor inlet 719. In the reactor 718, the contaminants with carbon chains of C8 or longer are broken down into organic compounds having carbon chains lengths of C6 or smaller. A treated liquid stream 729 containing catalyst exits the reactor 718 though an outlet 727. This stream enters a membrane filter 726 positioned downstream from the reactor outlet 727. The catalyst does not pass through the filter and is recycled via stream 724. The treated water stream 732 is mixed with the filtered liquid stream 714 to form treated water stream 734. The concentration of catalyst in the reactor is automatically increased during the reactor through the use of a catalyst concentration controller 736. Electrical lines 737 and 738 control the relative flow rates of the catalyst feeds and the aqueous liquid feed.

Figure 24:
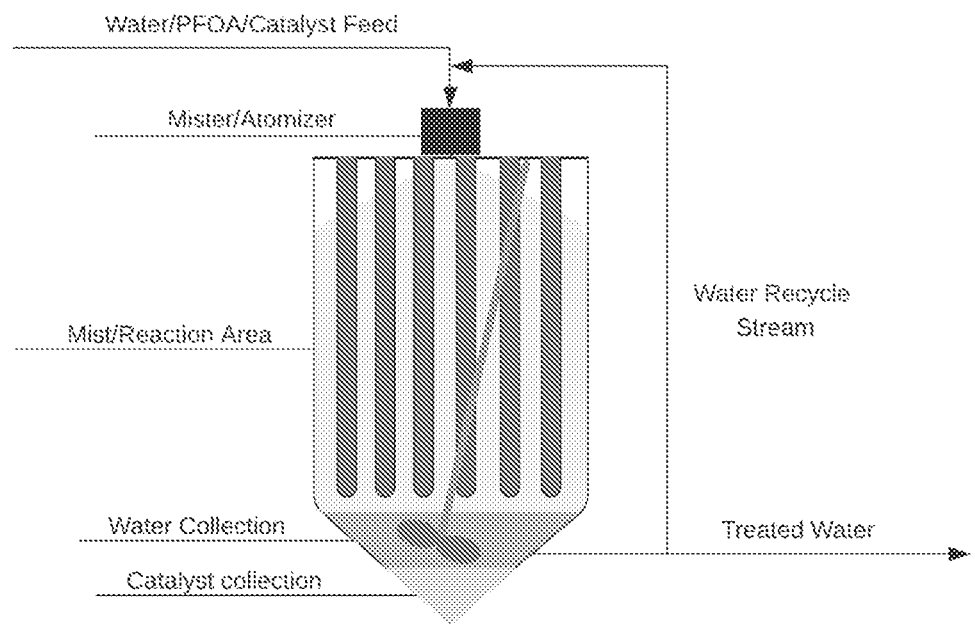
FIG. 24 shows a diagram of a photocatalytic reactor with a top feed atomizer/mister.
Figure 25:
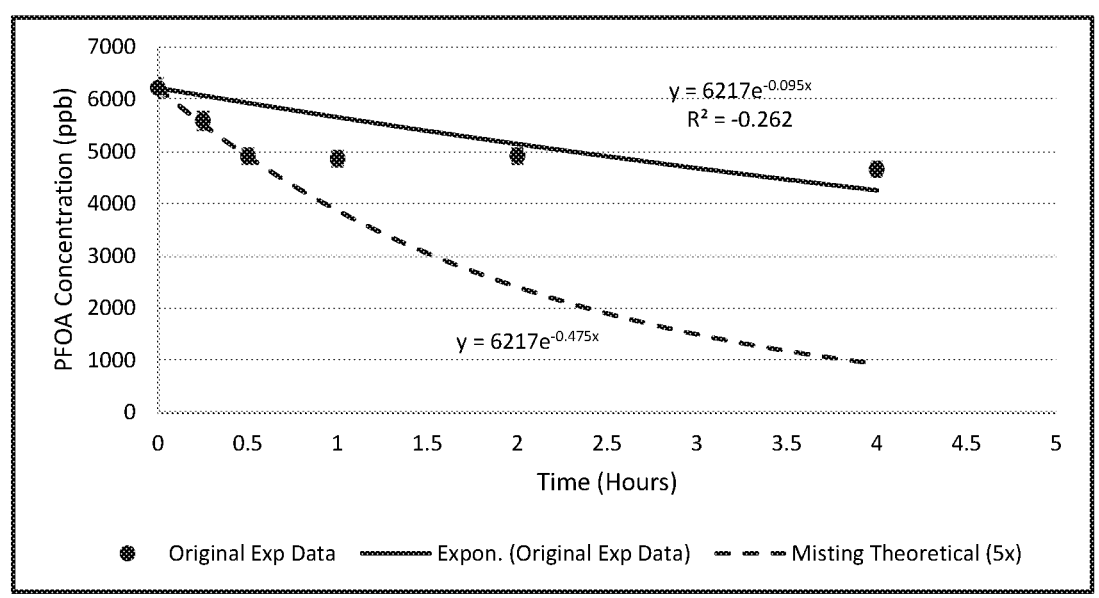
FIG. 25 depicts a plot of time vs PFOA concentration.

FIG. 24 shows a diagram of an atomizer/mister setup with the reactor. FIG. 25 depicts the hypothetical results as a plot of time vs PFOA concentration with error bars at a 95% confidence interval. The solid corresponding trendline is exponential with an equation of $y=6217e^{-0.095x}$. The broken trendline shows the expected 5× improvement of the misting system, with an equation $y=6217*e^{-0.475x}$.

In embodiments disclosed herein, when the catalyst concentration is ramped up, initial concentrations typically are in the range of about 20 mg/L to about 10 g/L, or about 1.2 g/L to about 3.5 g/L at the beginning of the reaction, and final catalyst concentrations are in the range of about 0.5 g/L to about 25 g/L, or about 4 g/L to about 6.5 g/L at the end of the reaction time. In embodiments, catalyst concentrations are increased for at least the first 50% of the total reaction time, and are then maintained at a current level. In some cases, the catalyst concentration is increased continuously, and in other cases, the catalyst concentration is increased only at certain times during the reaction. For example, depending on the mix of PFAS in the initial concentration flowing into the reactor, in the course of further sensitivity studies it was found to be beneficial to approach new equilibriums by staggering the increase in catalyst concentration.

In embodiments disclosed herein, the feed stream is atomized at the reactor inlet. In some cases, the microparticulate catalyst is combined with the feed stream before atomization. This pre-mixing can lead to improved mixing of the catalyst at the feed stream and therefore will improve the efficiency of the reaction by yielding better control over catalyst concentration in the reactor as it operates. In some cases, the atomization will occur in air, oxygen, nitrogen, ozone, ammonia or hydrogen sulfide, or Argon. In some cases, other controlled gaseous environments that may be composed of mixtures of the aforementioned gases, and other gases as determined to increase efficacy.

The microparticulate catalyst includes catalysts having an average particle size in the range of about 10 nm to about 20 microns, or about 0.5 micron to about 20 microns and a maximum particle size of about 200 microns. A nanoparticulate catalyst is a small microparticulate catalyst having an average particle size in the range of about 10 nm to about 200 nm and a maximum particle size of about 500 nm. Nanoparticulate catalysts are included within the (broader) definition of microparticulate catalysts. In embodiments, the catalyst has a mean particle size in the range of about 0.001 microns to about 5.0 microns. The catalyst is configured to be suspended in the water.

In some cases, the catalyst particles are mixed with the feed stream prior to reaching the nozzle and will be the nozzle's only feed stream. In this embodiment, the reaction commences as the atomized feed stream mixed with catalyst falls downwardly through the upper end of the reactor. In some cases, the atomizer includes a nozzle in which the liquid feed stream and a slurry containing catalyst particles enter the spray nozzle through separate nozzle inlets. In embodiments, the catalyst is introduced into the reactor through a separate inlet that the aqueous liquid feed stream.

The catalyst is disposed in a slurry in the photocatalytic reactor. The agitation mechanism is sufficient to ensure the presence of a generally homogenous mixture of the catalyst in the liquid.

One preferred catalyst for the methods described is BOHP. In embodiments, the BOHP has an average particle size in the range of about 0.5 microns, as was used in the examples.

Reaction temperatures typically are in the range of about 1° C. to about 99° C., or about 15° C. to about 30° C. Reaction pressures typically are in the range of about 0.5 atm to about 10 atm., or about 1 atm to about 5 atm. The reaction usually is conducted at atmospheric pressure.

A membrane filter is placed either at the reactor outlet, or outside of the reactor proximate the reactor outlet, to separate catalyst from the water stream. The filtration size of the membrane is selected to prevent even the smallest particles of catalyst from staying with the purified water.

In the photocatalytic reactor, the UV source typically is a UV lamp. In embodiments, the average intensity of UV irradiation in the photocatalytic reactor is in the range of about 1 mW/cm$^2$ to about 50 W/cm$^2$, or about 20 mW/cm2 to about 40 mW/cm2. In embodiments, the wavelength of the UV irradiation is in the range of about 150 nm to about 380 nm. The wavelength is typically 254 nm.

In embodiments, typically the pH of the feed stream will not be adjusted. However depending on the catalyst, the pH of the feed stream may be adjusted to achieve a pH in the range of about 1 to about 12, or about 2 to about 10, or about 2 to about 5. In some cases, the pH may be adjusted again in the purified water stream to match the initial feed stream pH or other required pH.

In some cases, the catalyst concentration controller includes a catalyst concentration sensor configured to measure the catalyst concentration in the reactor.

In some cases, contaminants are removed by transferring them to an aerosol and/or foam. In embodiments, contaminants are removed by destroying, isolating, or immobilizing the contaminant that is in the aerosol/foam.

The method and system can be scaled to process large volume water flow rates in the range of about 200,000 gallons per day to about 200 million gallons per day. In embodiments, the optimal functioning of the method does not require any minimum or maximum concentration of pollutants. The method and system can be configured such that the purified water stream contains no more than about 70 ppt (parts per trillion) of PFAS and PFOA.

In embodiments, the membrane upstream from the photocatalytic reactor has a molecular weight cut-off in the range of 200 daltons to 10,000 daltons.

The following examples are included to aid in understanding the disclosed embodiments, and are not intended to limit the scope of the disclosure.

Examples

MATLAB was used as a main modeling and calculation software. The degradation of PFOA for electrocoagulation, and photocatalysis was modeled in MATLAB. The calculations were based on kinetic data found in literature, which was based on experimental data. The theoretical kinetic models were compared with the experimental data points in order to see how well they fit and then they were used to determine how long each process would take to reach to achieve the desired goal concentration individually. Then the processes in series were modeled in order to get the final results and analysis.

The adsorption kinetics of PFOA on the Zinc hydroxide flocs are shown in Tables A.1, A.2, and A.3. The four sorption models used in disclosed embodiments were pseudo-first order kinetics, pseudo-second order kinetics, Elovich model and intraparticle diffusion model. In reference to the $R^2$ values, pseudo-second order kinetics best describes the sorption process.

TABLE A.1

Pseudo-First Order and Pseudo-Second Order Kinetics for Electrocoagulation Degradation of PFOA

| Type of kinetics | qe (mmol/g) | Rate Constant k | $v_0$(mmolg$^{-1}$h$^{-1}$) | $R^2$ |
|---|---|---|---|---|
| Pseudo-First | 5.52 | 7.68 | — | .950 |
| Pseudo-Second | 30.69 | 12.33 | $1.01 * 10^3$ | .987 |

TABLE A.2

Elovich Kinetics for Electrocoagulation Degradation of PFOA

| α (mmol g$^{-1}$h$^{-1}$) | β (mmol g$^{-1}$) | $R^2$ |
|---|---|---|
| $1.25 * 10^5$ | 1.36 | 0.972 |

TABLE A.3

Intraparticle Diffusion for Electrocoagulation Degradation of PFOA

| $K_{id}$ (mmol g$^{-1}$h$^{0.5}$) | I (mmol g$^{-1}$) | $R^2$ |
|---|---|---|
| 13.16 | 1.59 | 0.707 |

The assumption made by the pseudo-second order kinetic model is the sorption rate is controlled by diffusion, expressed as:

$$q_t = q_e(1 - e^{-k_1 t})$$

where $q_e$ and $q_t$ are the amount of PFOA adsorbed at equilibrium and at reaction time (t), respectively, and $k_1$(h$^{-1}$) is the calculated pseudo-first order rate constant of adsorption. It also assumes that the sorption rate is controlled by chemical sorption and the sorption capacity is proportional to the number of active sites on the sorbent, which can be described as:

$$\frac{t}{q_t} = \frac{1}{k_2 q_e^2} + \frac{1}{q_e}t = \frac{1}{v_0} + \frac{1}{q_e}t$$

where $k_2$(g mmol$^{-1}$h$^{-1}$) is the calculated pseudo-second order rate constant. The Elovich model was used to describe the chemical adsorption on highly heterogeneous adsorbents. However, since the equation above does not have the direct relationship to the concentrations of the PFOA, the MATLAB code used another pseudo-second order kinetic equation to describe the adsorption, expressed as:

$$\frac{1}{[C]} = \frac{1}{[C]_0} + kt$$

where t is the residence time, k is the pseudo-second-order rate constant, C is the concentration of PFOA at any time t, and $C_0$ is the initial concentration of PFOA. In order to verify the accuracy of calculations, the theoretical model was altered using the experimental conditions and the experimental data was plotted against it as shown in FIG. 6. The literature only had experimental data of perfluorooctane sulfonate (PFOS) instead of PFOA, therefore, the graph was created in regard to PFOS degradation. The graph verified that the code is a relatively good fit for the experimental data, the code was created with the initial concentration of 220 ppm (FIG. 7).

Example 1

In one of the embodiments, the photocatalytic degradation of PFAS was modeled by Langmuir-Hinshelwood kinetics, as follows:

$$r = k\frac{KC}{1 + KC}$$

Where r is the reaction rate, k is the rate constant for Langmuir-Hinshelwood kinetics, C is the concentration of PFAS, and K is the equilibrium absorption constant. However, when the concentration of PFAS is at the micromolar level, or KC<<1, the reaction rate can be simplified with pseudo-first order kinetics:

$$\ln\left(\frac{C}{C_0}\right) = -k_t \tau$$

Where $k_t$ is the pseudo time-based first-order rate constant (Xu et al. 2017), and τ is the residence time. This equation is relevant for reactions occurring in either a plug flow reactor (PFR) or a batch reactor. For a continuously stirred tank reactor (CSTR) the pseudo-first order kinetics follows this equation:

$$\frac{C_0 - C}{C} = k_t \tau$$

Due to the lack of information on the Langmuir-Hinshelwood kinetic parameters for the photocatalytic degradation of PFOA, the pseudo-first order kinetics were applied for the MATLAB calculations of this embodiment. In some embodiments, the pseudo-first order rate constants for photocatalysis using an indium oxide catalyst varies depending on the morphology of the indium oxide. Generally, the higher the surface area of the catalyst, the greater the reaction rate. The rate constants for porous nanoplates (PNPs), nanoplates (NPs), and nanoporous nanospheres (NPNs) are listed in Table A.4.

TABLE A.4

Pseudo-First Order Rate Constants for Indium Oxide Photocatalytic Degradation of PFOA

| Indium Oxide Morphology | Rate Constant $k_r$ (min$^{-1}$) | Source |
| --- | --- | --- |
| Porous nanoplates (PNPs) | 0.158 | Li et al. 2014 |
| Nanoplates (NPs) | 0.073 | Li et al. 2013 |
| Nanoporous nanospheres (NPNs) | 0.100 | Li et al. 2012 |

In order to test the accuracy of the pseudo-first order kinetic model, a graph was created using plots of concentration of PFOA versus time to compare the fit of the theoretical model to experimental results obtained from literature (FIG. 10). The conditions of the model were kept the same as those of their corresponding experiments.

After verifying that the pseudo-first order model sufficiently followed experimental results, it was used in disclosed embodiments to model the concentration of PFOA over time in order to calculate the amount of time needed for the photocatalytic reactor to run to completion. In this embodiment, it was modeled as if photocatalysis was the only remediation process in order to get an idea for the reaction time and reactor parameters. The initial concentration of PFOA for this run was 220 ppb and the flow rate was 3 million gallons per day. The data for the three morphologies of indium oxide that were listed previously were plotted in the same figure in order to compare their effectiveness. Plots were made for reaction occurring in a PFR or batch reactor (FIG. 11) and a CSTR (FIG. 12).

Example 2: A UV-Photocatalytic Reactor

In one of the embodiments, a photocatalytic reactor was modelled using SolidWorks. Only the internal structure of the reactor was modeled, not the external casing. The photocatalytic reactor prototype was designed to resemble a plug flow reactor as closely as possible. The general synopsis for the design of this embodiment shown in FIG. 14(a) is as follows: PFOA-contaminated water is meant to flow through the blue grate 314 on one end of the cylinder, within the transparent tube and around the yellow tubes and blue tubes/rods, then out through the other grate. The yellow tubes 312 represent UV light bulbs and the blue tubes/rods 316 represent the surface on which the catalyst is coated.

In disclosed embodiments, there are several features of the design which address the specific needs of a photocatalytic reaction. The grates 314 on either end of the reactor allow for the water to flow through with minimal turbulence in order to maintain the desired laminar flow for a plug flow reactor. It also holds the tubes for the UV lights 312 and catalyst coating surfaces (tubes or rods) 316 so that they remain stationary within the reactor. The tubes for the lights and tubes or rods for catalyst surfaces are spaced out evenly in a radial pattern so that there exists an even amount of light and surface area for reaction throughout the reactor. Furthermore, the yellow tubes 312 represent UV light bulbs encased within a transparent tube which permits the transmission of UV light and also protects the light bulbs from the pressure introduced by the water when it runs through the reactor. The casing of the reactor 318 (shown as transparent in the diagrams) is coated with a reflective material on the inside so that there is an increase in UV transmission to the water.

Example 3: Sonolysis

In some of the embodiments, it was found that at high concentrations, the rate of degradation by sonolysis follows pseudo-zero-order reaction kinetics, where the reaction rate constant is dependent on concentration, i.e., the rate constant decreases as concentration of reactant decreases (Vecitis et al., 2008a). However, when the concentration is low enough, the reaction begins to switch over to pseudo-first-order reaction kinetics. The reaction constant also decreases roughly incrementally with decreasing concentration. That data was then modeled in MATLAB based on an initial concentration of PFOA. Modeling the degradation rate in MATLAB was accomplished by coding a piecewise step function of increasing vector size of the rate equation and of residence time. The increase in vector size was dependent on whether the concentration of PFAS had reached the threshold for the new "step" and new rate equation. Therefore, the overall graph of PFOA concentration was a piecewise function based on itself rather than on the x-value, which was time. The code was executed following the kinetic rate equations of reactions occurring in both a PFR and CSTR to compare the effectiveness of each.

In embodiments with high concentrations, for PFR and CSTRs, the following zero-order standard kinetic equation was used:

$$\frac{k\tau}{Cao} = \frac{Cao - Ca}{Cao}$$

In embodiments with lower concentrations, for PFR and CSTR, the following first-order standard kinetics equations were used, respectively:

$$k\tau = \ln\left(\frac{Cao}{Ca}\right)$$

$$k\tau = \frac{Cao - Ca}{Ca}$$

The process was modeled in MATLAB as follows: first an initial value is set for the starting concentration of PFOA in mol/L. From there it was converted to mg/L, which is the unit of concentration used in the majority of the code. The goal concentration of 70 ppt was then set as well as all of the rate constants. All the possibilities for the if statements were initialized to zero in order to keep track of where the starting concentration began in the code and also for graphing purposes.

The core of the code involves an outer while loop that ensures that the program will continue to run until the concentration of PFOA reaches the goal concentration. Within this while loop, there is a series of if statements that determines the rate constant and the specific rate equation that is required based on the current concentration of PFOA. First, the time it takes to go from the starting concentration to the ending concentration of the current step is determined. Then the concentration at the end of the step is determined, which is already set by the bounds found from experimental data. Then that if statement's tracking value is set from 0 to 1 to ensure that the if statement was executed and that the vector operations work out, as well as for troubleshooting purposes. Then a vector, tspan, is created which contains values between 0 and the time it takes to reach the concentration at the end of the step, using linspace. Next, an output vector of concentration values is initialized via a zeros vector of the same length as the tspan vector. Then, a variable, i, which is used to keep track of how long the tspan and output vectors are, is set to 1. Then, a for loop repeats for all values of tspan as well as each time the output value at position i in the vector changes based on the appropriate rate equation. During each for loop iteration, 1 is added to i so that the correct concentration replaces the 0 in the correct spot in the output vector.

Then, the next if statement executes, in which many of the same steps occur. The main difference is that if the previous step's tracking value is set to 1, then the step function continues with the existing values for time, whereas if it didn't execute and it's value is still 0, then it executes starting from time 0, the same as previously described. If the tracking value is 1, however, the main difference is that after the tracking value for the current if statement is set to 1, a new time span vector is created from the previous ending time value to the current ending time value. That vector is then added to the end of the tspan vector and a vector of zeros with the length of the added time span vector is added to the end of the output vector. Then, the for loop occurs again for all values in the added time span vector, with the ending time of the last step subtracted 0 to "perturb" the values to allow the equation defining output at location, i, to remain accurate. Lastly, i, is again increased by 1 for each iteration of the for loop. Whether the reaction follows first- or zero-order kinetics was determined based on an intermediate concentration value that exhibited aspects of both pseudo-zero- and pseudo-first-order kinetics.

Finally, once the goal concentration is met, the while loop exits and the code proceeds to graph the vectors with the tspan vector on the x-axis and the output vector on the y-axis. Depending on the initial concentration and subsequent tracking number true/false values, the code will plot several graphs, one at high concentrations and very low time values to illustrate the stepwise linear zero-order reactions, and another to illustrate a more broad picture from when time equals zero to the ending time that it takes to reach to goal of 70 ppt. The graphs for the concentration of PFOA over time for both a PFR and CSTR are shown in FIG. 6 and FIG. 7.

Example 4: Electrocoagulation and Photocatalysis in Series

After obtaining results for electrocoagulation, photocatalysis, and sonolysis, it was concluded that sonolysis was less viable a remediation process as it was thought due to costliness and rate of reaction. Therefore, in some of the embodiments, it was decided to combine just electrocoagulation and photocatalysis in series (FIG. 3). The theory behind the calculations for each process remained the same as in their previous scripts. The concentration versus time graph for electrocoagulation was plotted until the rate of reaction slowed significantly. In one embodiment, it came out to be at around one hour of reaction time. This is also a reasonable residence time for the coagulation-flocculation step of a drinking water treatment plant although it may change depending on the needs of the specific plant. In a piecewise manner, the concentration results for photocatalysis was plotted, taking an input initial PFOA concentration equal to that with which the electrocoagulation run had ended. Photocatalysis continued to run until the goal concentration was reached. A plot of the results is shown in FIG. 13.

Example 5: Electrocoagulation

The experimental data is only available for PFOS and not PFOA, the theoretical model with the experimental data was modeled with PFOS conditions. This factor should be taken into consideration while using the theoretical model to model the PFOA concentration with time.

In some of the embodiments with electrocoagulation, it was found that the higher the concentration of PFAS, the faster it is removed. This can be seen in FIG. 8 and FIG. 9. While the difference in concentration is very large, the higher concentration of PFAS was able to degrade by almost 90% within 20 minutes while the lower concentration took around 30 minutes to degrade the same percentage of PFAS. In order to upscale the electrocoagulation to fit a 3 million gallons per day facility, the volume of the reactor was calculated to be around 475 m$^3$ with the anode and cathodes following each other consecutively. For some of the disclosed embodiments the residence time for electrocoagulation was as low as 30 minutes.

Example 6: Photocatalysis

In another embodiment, when plotting the theoretical pseudo-first-order model with the experimental data from literature (FIG. 8) only one of the indium oxide morphologies had a very good fit, with each point landing within about ±0.5 units of its corresponding theoretical line. This happened to be the porous nanoplate (PNP) morphology of indium oxide. In some embodiments, the nanoporous nanospheres (NPNs) and the nanoplates (NPs) did not fit the model nearly as well. This may have been due to the fact that the experimental data points are based on a single set of data. The PNP's theoretical model had the best fit and was mainly used for the results for this morphology.

In one embodiment, it was clear from FIG. 8, as well as from FIG. 9 and FIG. 10 that the PNP morphology yielded the highest reaction rate, followed by NPNs and NPs. The trend remains the same for photocatalysis occurring in PFRs, batch reactors, and CSTRs. The increasing reaction rate corresponds with an increasing pseudo-first order rate constant for the morphologies as well as increasing surface area. The surface areas for the porous morphologies (PNP and NPN) are higher than that of the nonporous nanoplates.

Example 7

In another embodiment, the amount of time taken for the PFOA to degrade to 70 ppt was much lower in the PFR/batch reactors than in a CSTR. For PNPs in a PFR or batch reactor, the required residence time was about 50 minutes. With a flow rate of 3 million gallons per day, this means that a total reactor volume of about 400 m$^3$ is required. Since this was a rather large reactor volume, in some embodiments, it is possible that multiple smaller reactors should be placed in series.

Example 8

In another embodiment with the same morphology in a CSTR, the required residence time is 19,900 minutes, or nearly 2 weeks. This requires a massive reactor volume of over 150,000 m³. Residence times and reactor volumes for other morphologies can be found in Table B.1. Since the reaction in a CSTR takes magnitudes longer than the same reaction in a PFR, it is highly preferred that a PFR is used in order to increase efficiency in virtually every aspect. As such, indium oxide porous nanoplates in a plug flow reactor was used in some embodiments.

TABLE B.1

Required residence times and reactor volumes for indium oxide photocatalysis only. (Not in combination with electrocoagulation.)

| Reactor Type | $In_2O_3$ Morphology | Residence Time (min) | Reactor Volume (m³) |
|---|---|---|---|
| PFR | PNP | 51 | 402 |
|  | NP | 110 | 870 |
|  | NPN | 80.5 | 635 |
| CSTR | PNP | 19,900 | 157,000 |
|  | NP | 43,400 | 339,000 |
|  | NPN | 31,400 | 248,000 |

Example 9: Electrocoagulation and Photocatalysis in Series

In some embodiments, the electrocoagulation reaction slowed down significantly when it reached one hour of residence time (FIG. 13). The PFOA concentration at this stage was found to be about 7 ppb. This means the concentration decreased to about 3% that of the initial. This 7 ppb then became the initial concentration for the photocatalytic reaction which required approximately 40 minutes to degrade the PFOA down to the desired 70 ppt. Therefore, in one embodiment the total amount of time required for the PFOA degradation process to run was 1 hour and 40 minutes.

A number of alternatives, modifications, variations, or improvements therein may be subsequently made by those skilled in the art, which are also intended to be encompassed by the following claims. The foregoing embodiments are therefore to be considered in all respects illustrative rather than limiting on the invention described herein. Scope of invention is thus indicated by the appended claims rather than by the foregoing description, and all changes that come within the meaning of equivalency of the claims are intended to be embraced therein.

Example 10: Photocatalysis with Additional Filtration Membrane

In another embodiment, PFAS can be eliminated from a water contaminant stream through either a continuous or batch method. The feed contaminant stream is first directed to a membrane(s) where it is separated into a treated water stream and a concentrated contaminant stream. The treated water stream needs no further processing, and the concentrated contaminant stream is then directed to the Photocatalytic Reactor.

This reactor can be a (stirred) (semi)batch reactor. Fresh catalyst is injected into the reactor via the fresh catalyst stream according to contaminant concentrations and existing catalyst concentrations within the reactor. The catalyst is mixed with the contaminant stream in the reactor to form a slurry. A treated stream then exits the reactor via two methods. In FIG. 1, there is an internal filter system (FIG. 15) that contains catalyst within the reactor, and no further treatment of the exit stream is necessary, it joins with the treated stream from the membrane(s). In FIG. 2, the treated stream is directed to a separate filter/membrane (FIG. 16) that separates the catalyst from the stream. The treated water stream is then joined with the treated stream from the first membrane(s). The catalyst recovered from the filter/membrane is fed back to the reactor.

This reactor may be set up in parallel and/or in series with other reactors of the same type to achieve pseudo-steady flow. For example, one reactor may be filling while the other is treating water, while a third is emptying its treated water contents. This will allow a steady flow of water flowing to the reactor group and leaving from it.

The catalyst used within the process is a photocatalyst or mix of photocatalysts. These catalysts include bismuth oxyhydroxyphosphate, indium oxides, thallium oxides, and bismuth oxides, and catalysts with the chemical compositions shown below. Catalysts may also be doped with other metals such as Platinum, Palladium, or Iron.

TABLE C

Non-Limiting Examples of Photocatalysts

| Final Formulas | Name |
|---|---|
| CaS | Calcium Sulfide |
| $Ce_2O_3$ | Cerium Oxides (including the following) |
|  | BaCeO3, Barium Cerium Oxide |
|  | $CeO_3Sr$, Cerium Strontium Oxide |
|  | $CaCeO_3$, Calcium Cerium Oxide |
|  | $CeMgO_3$, Magnesium Cerium Oxide |
| $CdIn_2O_4$ |  |
| $In_2O_4Zn$ |  |
| $Ga_2MnO_4$ |  |
| $NiO_3Sn$ |  |
| $AlCeO_3$ |  |
| $In_2O_3$ | Indium Oxides (involving In and O atoms) |
| $Ga_2O_3$ | Gallium Oxides (Involving Ga and O atoms) |
| $Bi_3O(OH)(PO_4)^2$ | Bismuth Oxyhydroxy Phosphate (BOHP) (Petitjeanite) (and other Bismuth Oxides) |
| $Tl_2O_3$ | Thallium Oxides |

In one experiment, the reaction kinetics of the photocatalytic degradation of perfluorooctanoic acid (PFOA) were evaluated using bismuth oxyhydroxyphosphate (BOHP) as the photocatalyst to gain insight. This was done on a 30-gallon scale. (FIG. 17) While previous studies have shown successful degradation in bench-scale experiments (200 mL), there are no reports of successful degradation of PFOA on larger-scale systems using BOHP (Sahu et al., 2018). The objective of the experiment was to measure the concentration of PFOA, PFHpA, and PFHxA over time and analyze the degradation rate.

Here, 12 55-Watt, 254 nm UV lights were used in the reactor, and bismuth oxyhydroxyphosphate at 1.5 g/L was used as a photocatalyst. The reactor was filled with 90 L of DI water and then doped with 0.55 grams of PFOA to get a theoretical initial PFOA concentration of 5 ppm. The reaction mixture was then allowed to stir for 1 hour to ensure absorption equilibrium. The lamps were then powered on for 4 hours, with continuous stirring. Samples were taken at 0, 15, 30, 60, 120, and 240 minutes. Samples were taken using a peristaltic pump and silicon tubing. The silicon tubing was changed after each sample to prevent contamination. Prior to PFOA doping, a sample was also taken to check for any contamination within the system. Samples were collected into 1 L HDPE Nalgene bottles, allowed to settle overnight, and then filtered to ensure no catalyst was present in samples. Samples were analyzed by UConn's Center for Environmental Sciences and Engineering using EPA Method 537.1.

Looking at FIG. 18 and FIG. 19, we see a PFOA degradation of 25%, and an increase in PFHpA and PFHxA. PFOA is breaking down into PFHpA and PFHxA, however this only accounts for 30% of the degraded PFOA. The account of the remaining 70% is unclear. Our best guess is that further break down to shorter chain PFAS was achieved, at least in part. An exponential line is fitted to the PFOA plot and gives a first-order rate equation of $[PFOA]=[PFOA]_0 * e^{-0.095t}$.

The experimental data shows a PFOA degradation of ~25%. It also shows PFOA is degrading to PFHxA and PFHpA. This accounted for 30% of the degradation. A more robust analysis will need to be done in future experiments to fully account for the degradation. From the first-order rate equation, we get a rate constant of 0.95 $h^{-1}$ for PFOA. While this is a slightly higher reaction rate than we had anticipated with the current reactor design, as photocatalysis is generally viewed as not easily scaled up, it was also lower than previous experiments done on small scale (6 $h^{-1}$) (Sahu et al., 2018). The results provide insight and validation of the theorized reaction kinetics of the photocatalytic degradation of PFOA. The breakdown into smaller and smaller chains is validated for PFHxA and PFHpA, and for the first time, shows successful breakdown on a large scale.

In future experiments, we believe a much more efficient rate constant can be achieved. This set-up has an average light-source to light-source distance of >2 inches. Comparing this to the literature values of 1-2 cm, the reactor was underpowered. There was also contamination due to wood fibers from the construction of the system. Additionally, optical observation of the catalyst indicates a rusty discoloration, which we assume to be rust, likely caused by the propeller shaft grinding on the bottom of the barrel. In future experiments we will add more lights to decrease the average spacing distances and adjust catalyst concentrations to achieve a more efficient reaction. We would also like to eliminate the wood fiber contamination and prevent the propeller shaft from rubbing on the barrel.

Example 11: Catalyst Ramping System

One efficiency increasing method is a catalyst concentration controller/ramping system that increases the concentration of catalyst in the reactor as time goes on. The catalyst ramping system works by controlling the flow rates of the Fresh Catalyst Stream and/or the Catalyst Recycle Stream. As PFAS concentration decreases in the reactor, it will increase catalyst concentration within the reactor, to keep an optimal reaction rate.

Specifically, as PFAS is broken down and destroyed, there will be significant mass transport issues at very low concentrations. As a result, the rate at which PFAS interacts with catalyst will decrease significantly, which will decrease reaction rate. Therefore, starting at a low catalyst concentration, while PFAS concentration is high will allow light to penetrate farther into the reactor allowing a higher average reaction rate as PFAS easily interacts with catalysts. As PFAS concentration decreases, decreased interaction with the catalyst will be the primary cause of decreased reaction rate. Therefore, increasing the catalyst concentration in a thoroughly mixed reactor such as ours, will increase catalyst interaction with PFAS. That will disallow light from being able to penetrate as deeply into the reactor, causing a high variability in local reaction rates.

Rates closer to light bulbs will be significantly higher than rates farther from light bulbs, which is why thorough mixing will be important. As long as PFAS has a chance to interact with and sorb to the catalyst, which through mixing, eventually passes close by to a light source, it will be broken down. It may not make sense to start out with a higher catalyst concentration because that would hamper light penetration in the reactor unnecessarily at a time when mass transport of PFAS to catalyst surface will be less of an issue. As a result, a catalyst ramping system like the one we have described here will be able to boost efficiency. It will balance the need for light penetration with mass transport to catalyst surface by modulating light intensity, and/or catalyst concentration and/or reactor turbulence and mixing as the reaction progresses through an automated program.

In one experiment, the reaction kinetics of the photocatalytic degradation of perfluorooctanoic acid (PFOA) was evaluated on a 30-gallon scale using bismuth oxyhydroxyphosphate (BOHP) as the photocatalyst. (FIG. 20) Previous experiments showed promising results, with one demonstrating a pseudo-first-order rate constant of 0.095 $h^{-1}$ for PFOA. The objective of this experiment was to analyze how the addition of a catalyst ramping system affects the reaction rate of PFOA, PFHpA, and PFHxA. This is done by measuring the outlet concentration for each compound at various times throughout the experiment.

Here, 12-36 55-Watt, 254 nm UV lights are used in the reactor, and bismuth oxyhydroxyphosphate (BOHP) at varying concentrations (0.5-2 g/L) is used as a photocatalyst. As shown in FIG. 21, the reactor is charged initially with a feed of water doped with PFOA. The mixture is then fed a predetermined amount of catalyst slurry from the Catalyst Holding Tank. The mixture is allowed to equilibrate for an hour and then the UV lights are turned on for 4 hours. As the reaction proceeds, additional catalyst is fed to the reactor (rate TBD), via the Catalyst Holding Tank, to compensate for the degradation of PFOA. See the Initial Experimental Results section for sampling and sample analysis procedure.

From FIG. 21, we see a PFOA degradation of 25% in the original experimental setup. We can estimate the pseudo-first-order rate constant to be 0.095 $h^{-1}$. We expect the addition of the catalyst ramping system to increase PFOA degradation by at approximately 3×, to a rate of at least 0.285 $h^{-1}$. This theoretical degradation is depicted by the orange trendline in FIG. 21. This would result in a total PFOA degradation of at least 70%.

Example 12: Atomizer with Spray Nozzle

In another embodiment, a large-scale photocatalytic system that is set up in largely the same way but instead of a bulk-liquid to carry out the chemistry, there is a misting system to create small droplets in a gas. The reactor may include a spray nozzle or atomizer. A contaminated spray or mist is fed into the reactor and the treated condensate is then collected at the bottom and filtered through either an internal (FIG. 22) or external filter (FIG. 23).

This system has improved efficacy and efficiency because the PFAS-contaminated water would be mixed into a slurry with catalyst prior to entering the reactor. It would enter the reactor through a nozzle that atomizes the slurry into a fine mist. These droplets would then achieve terminal velocity and slowly fall through the reactor, perhaps held aloft longer by upwards moving gas streams. There are a few well-known properties of photocatalytic reactors and PFAS that could make this type of reactor much more efficient and effective than a traditional bulk-liquid design. Namely, PFAS are surfactants, so they will naturally migrate to the outside of the falling droplet to the gas-liquid interface. Due to the small droplet volume, the catalyst will have increased interaction with the surface, which would help reduce mass-transport issues discussed previously when describing our ramping system.

Beyond that, it is well known that photocatalytic reactors are generally more efficient at a smaller scale. In our view, what we are doing with this design is effectively creating a multitude of "nano-reactors" the size of mist droplets, even smaller than any reactors used in industry today. These "nano-reactors" would be self-contained as they fall separately, reacting to completion before collecting at the bottom. By having droplets falling in gas, light can also penetrate much farther into the reactor, which may further drive up efficiency by providing the "nano-reactors" all the light they need. It is possible two or more of these would need to be used in series if reactions don't go to completion and/or in parallel if desired flow capacity is not achieved with a single reactor. Rather than in-series reactors, a recycle stream may also be used in a single reactor. In this way, we expect to be able to effectively and efficiently scale up photocatalysis to nearly any scale. We expect this method to allow us to overcome mass transport and light penetration issues to result in much higher reaction rates and efficiency than a traditional bulk-liquid design. It would be worth investigating different atmospheres to use in this set-up, as this may play a major role. Air or oxygen would allow the formation of ozone, which may either help the reaction occur faster, or slow it down. Other gases may encourage PFAS to migrate more strongly to the surface of the droplets. We have not seen evidence of any such reactor having been attempted to be constructed before on any scale, in any photocatalytic application.

A hypothetical experiment was conducted to gain insight into the reaction kinetics of the photocatalytic degradation of perfluorooctanoic acid (PFOA) using bismuth oxyhydroxyphosphate (BOHP) as the photocatalyst. This was done on a 30-gallon scale. Previous experiments performed by us have shown promising results, with one demonstrating a pseudo-first-order rate constant of 0.095 $h^{-1}$ for PFOA. The objective of this experiment is to analyze how the addition of a mist/atomized inlet feed affects the reaction rate of PFOA, PFHpA, and PFHxA. This is done by measuring the outlet concentration for each compound at various times throughout the experiment. A diagram of the experimental setup is depicted in FIG. 24.

Here, 12-36 55-Watt, 254 nm UV lights are used in the reactor, and bismuth oxyhydroxyphosphate (BOHP) at varying concentrations (0.5-2 g/L) is used as a photocatalyst. As shown in FIG. 24, a mixed feed of water, PFOA, and BOHP (Concentrations TBD) is fed to the atomizer/mister. The mist then slowly settles to the bottom of the vessel, reacting as it falls. The settled mist collects and stirs at the bottom of the reactor. The liquid water layer is removed as needed for sampling or when the reaction is complete. If being removed when the reaction is complete, the agitator will be turned off and the mixture will be allowed to separate before removing the liquid water layer. There is an option to recycle the exit stream if the settling rate is not long enough, and further residence time in the reactor is needed. For sampling and sample analysis procedure, see the original Experimental Memo.

From FIG. 25, we see a PFOA degradation of 25% in the original experimental setup. We can estimate the pseudo-first-order rate constant to be 0.095 $h^{-1}$. We expect the addition of the misting system to increase PFOA degradation by at approximately 5×, to a rate of at least 0.475 $h^{-1}$. This theoretical degradation is depicted by the orange trendline in FIG. 25. This would result in a total PFOA degradation of at least 85%.

A number of alternatives, modifications, variations, or improvements therein may be subsequently made by those skilled in the art, which are also intended to be encompassed by the following claims.

What is claimed is:

1. A method of treating an aqueous solution containing impurities including a perfluoroalkyl substance and/or a polyfluoroalkyl substance, comprising:
    introducing the aqueous solution into a batch or semi-batch photocatalytic reactor with a microparticulate catalyst configured to reduce chain length of the perfluoroalkyl substance and/or polyfluoroalkyl substance in the presence of UV light, forming a treated aqueous stream, the reactor including a catalyst concentration controller configured to automatically increase the catalyst concentration in the reactor while agitating the catalyst-containing solution during a reaction occurring in the presence of UV light,
    removing catalyst particles from the treated aqueous stream to form a purified aqueous stream, and
    recycling the removed catalyst particles to the reactor.

2. The method of claim 1, wherein the step of removing catalyst particles comprises separating the catalyst particles from the treated aqueous stream with a filtration membrane.

3. The method of claim 2, wherein the filtration membrane is positioned inside the photocatalytic reactor.

4. The method of claim 2, wherein the filtration membrane is positioned outside the photocatalytic reactor.

5. The method of claim 1, wherein the microparticulate catalyst has an average particle size in the range of about 1 nm to about 50 μm.

6. The method of claim 1, wherein the microparticulate catalyst has an average particle size in the range of about 1 nm to about 1 μm.

7. The method of claim 1, wherein the perfluoroalkyl substance and/or a polyfluoroalkyl substance includes at least one of perfluorooctanoic acid, perfluorooctanesulfonic acid, and anions thereof.

8. The method of claim 1, wherein the microparticulate catalyst is combined with the aqueous solution upstream from an inlet to the photocatalytic reactor.

9. The method of claim 1, wherein the aqueous solution is introduced into the photocatalytic reactor using a spray nozzle.

10. The method of claim 8, wherein the aqueous solution is introduced into the photocatalytic reactor using a spray nozzle.

11. The method of claim 1, further comprising removing particles from the aqueous solution having a size greater than 0.5 μm before the aqueous solution is introduced into the photocatalytic reactor.

12. The method of claim 1, wherein the catalyst comprises bismuth oxyhydroxyphosphate (BOHP).

13. A method of treating an aqueous solution containing impurities including a perfluoroalkyl substance and/or a polyfluoroalkyl substance, comprising:

combining the aqueous solution with a microparticulate catalyst configured to reduce chain length of the perfluoroalkyl substance and/or polyfluoroalkyl substance in the presence of UV light to form a reactor feed stream, the catalyst being introduced using an automatic catalyst concentration ramping system, introducing the reactor feed stream into a batch or semi-batch photocatalytic reactor through a spray nozzle, agitating the contents of the reactor during a reaction, forming a treated aqueous stream, and removing catalyst particles from the treated aqueous stream to form a purified aqueous stream.

14. The method of claim 13, wherein the spray nozzle comprises a single-stream atomizer.

15. The method of claim 13, wherein the spray nozzle is a two-component nozzle and a gas stream is mixed with the liquid stream aqueous solution.

16. A water purification system containing impurities including a perfluoroalkyl substance and/or a polyfluoroalkyl substance, comprising:

a batch or semi-batch photocatalytic reactor comprising an inlet configured to receive an aqueous feed stream and a catalyst, an outlet for a treated aqueous stream, a reaction vessel containing a UV light source and an agitator, a catalyst concentration ramping control system configured to automatically increase microparticulate catalyst concentration in the reactor during a reaction, and a spray nozzle configured to atomize the aqueous feed stream.

17. The water purification system of claim 16, further comprising a catalyst separator disposed proximate the reactor outlet configured to separate catalyst from the treated aqueous stream.

18. The water purification system of claim 16, further comprising a catalyst inlet disposed upstream from the spray nozzle in order to combine the aqueous feed steam and the catalyst before atomization.

19. The water purification system of claim 16, further comprising a filter disposed upstream from the photocatalytic reactor, the filter being configured to remove particles having a size greater than 0.5 µm from the aqueous stream.

20. The water purification system of claim 16, wherein the spray nozzle comprises a single-stream atomizer.

* * * * *